United States Patent
Shimizu

(10) Patent No.: US 7,735,382 B2
(45) Date of Patent: Jun. 15, 2010

(54) MAGNETOSTRICTIVE MECHANICAL QUANTITY SENSOR AND METHOD FOR MANUFACTURING SAME

(75) Inventor: Yasuo Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 341 days.

(21) Appl. No.: 11/708,477

(22) Filed: Feb. 21, 2007

(65) Prior Publication Data

US 2007/0193372 A1    Aug. 23, 2007

(30) Foreign Application Priority Data

Feb. 21, 2006  (JP)  ............................. 2006-044477

(51) Int. Cl.
  *G01L 3/00*  (2006.01)
(52) U.S. Cl. ................................. 73/862.333
(58) Field of Classification Search ............ 73/862.331, 73/862.332, 862.333, 862.335
  See application file for complete search history.

(56) References Cited

U.S. PATENT DOCUMENTS

| | | | | |
|---|---|---|---|---|
| 4,906,306 A | * | 3/1990 | Araki et al. ................. | 428/682 |
| 5,924,519 A | * | 7/1999 | Shimizu et al. ............. | 180/444 |
| 6,527,642 B1 | * | 3/2003 | Arai et al. ................... | 464/104 |
| 6,595,074 B2 | * | 7/2003 | Shimizu et al. ........ | 73/862.333 |
| 2001/0002630 A1 | * | 6/2001 | Watanabe et al. ........... | 180/444 |
| 2002/0029923 A1 | * | 3/2002 | Tanioka ..................... | 180/444 |
| 2002/0117348 A1 | * | 8/2002 | Shimizu et al. ............. | 180/443 |
| 2004/0226384 A1 | * | 11/2004 | Shimizu et al. ............... | 73/762 |
| 2007/0068726 A1 | * | 3/2007 | Shimizu ..................... | 180/444 |
| 2008/0245161 A1 | * | 10/2008 | Shimizu ................ | 73/862.333 |

FOREIGN PATENT DOCUMENTS

| JP | 2001-133337 A | 5/2001 |
|---|---|---|
| JP | 2004-309184 A | 11/2004 |

* cited by examiner

*Primary Examiner*—Lisa M Caputo
*Assistant Examiner*—Freddie Kirkland, III
(74) *Attorney, Agent, or Firm*—Arent Fox LLP

(57) ABSTRACT

A magnetostrictive mechanical quantity sensor for detecting torque or axial force is disclosed, which sensor comprises a hollow shaft and an operation shaft. The hollow shaft has a magnetostrictive film formed on its outer perimeter surface. The operation shaft is subject to torque or axial force acting from outside and is linked to and fit inside the hollow shaft.

3 Claims, 9 Drawing Sheets

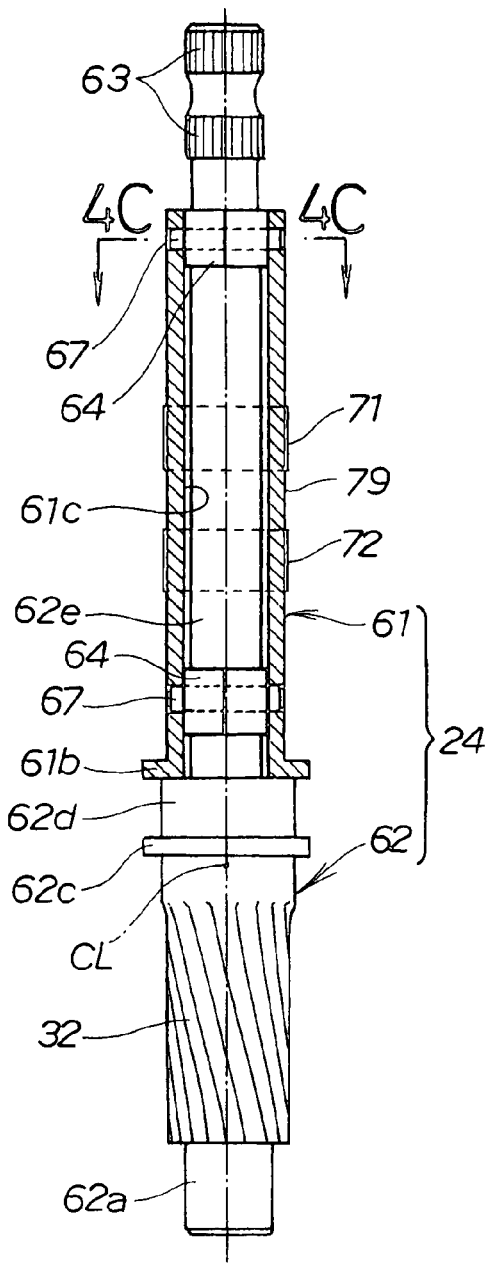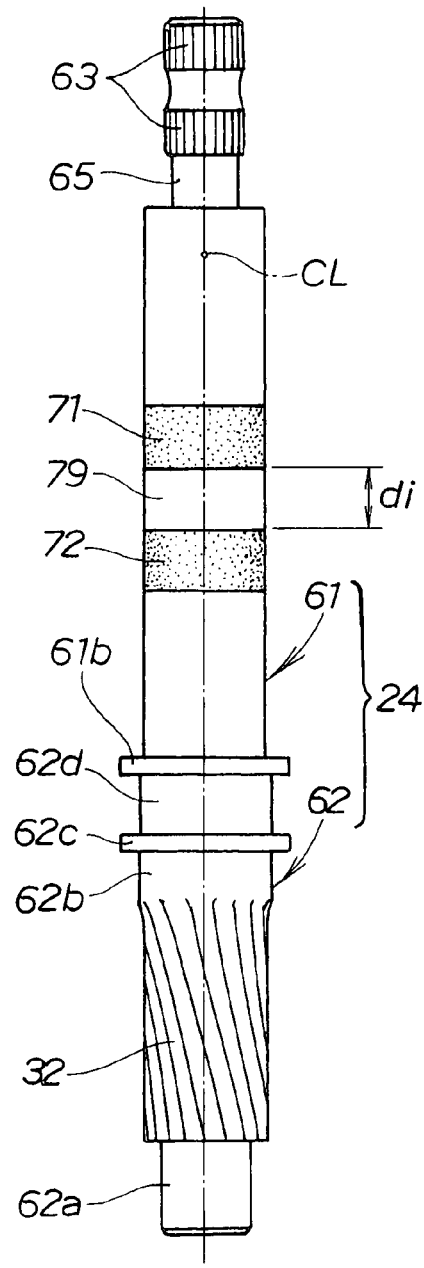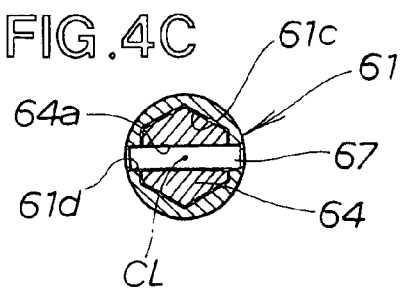

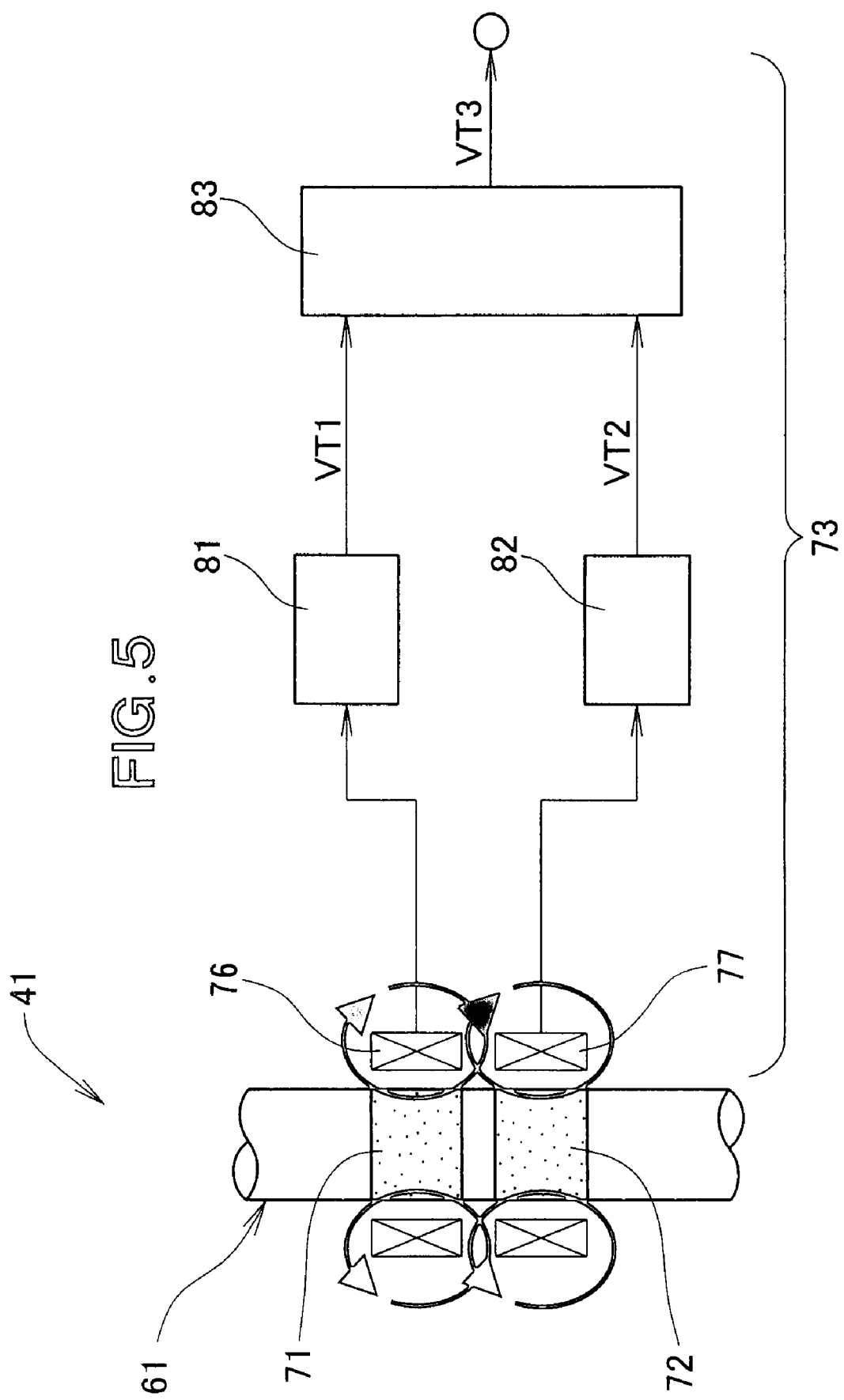

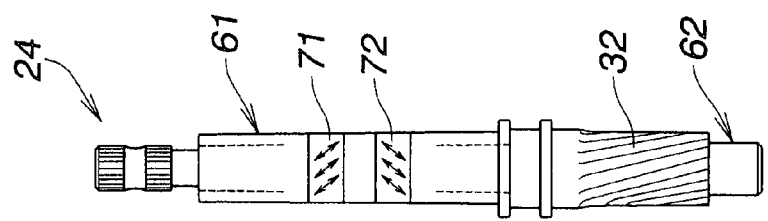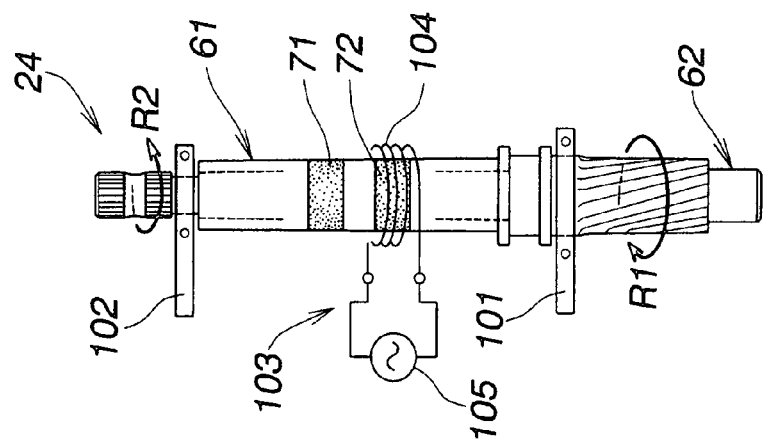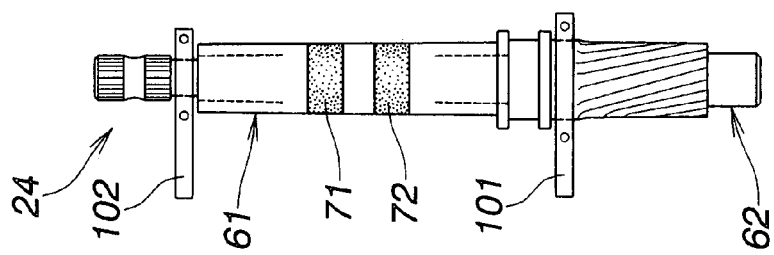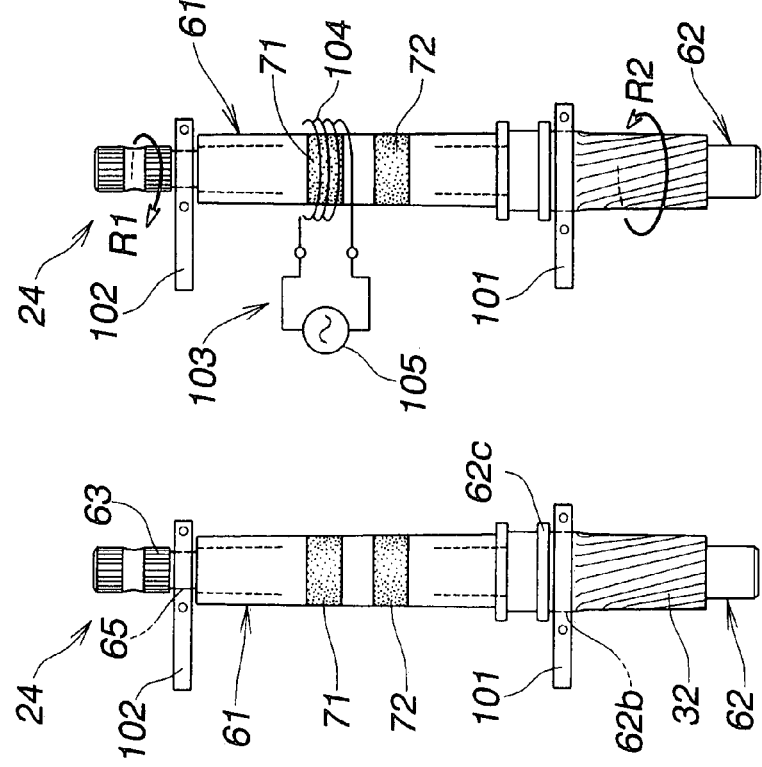

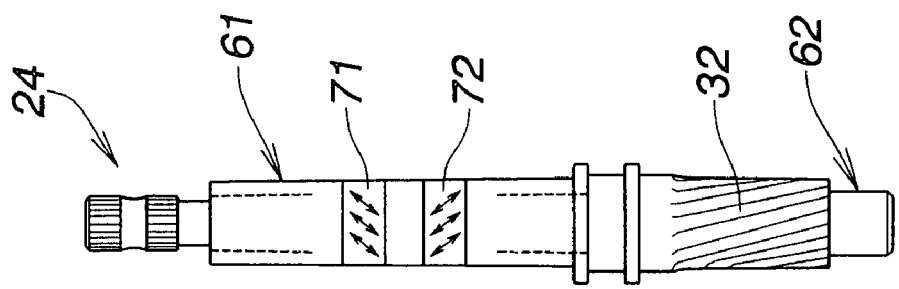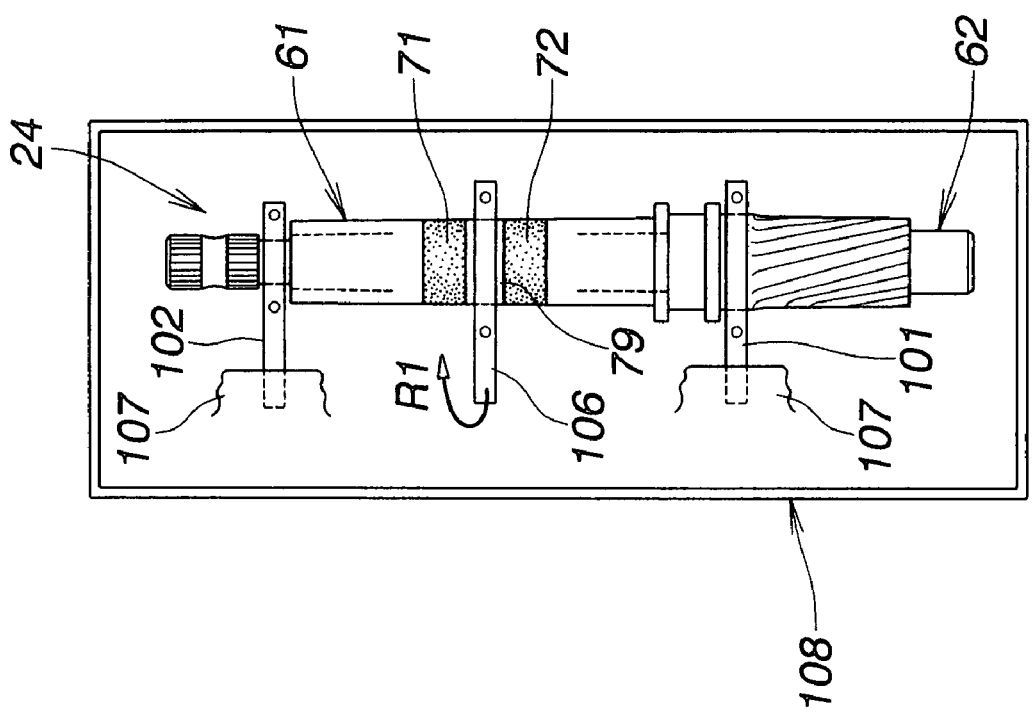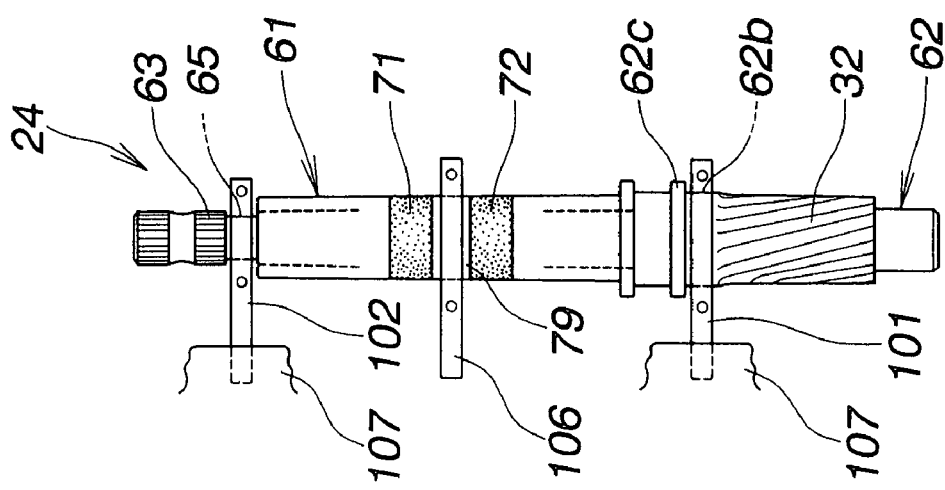

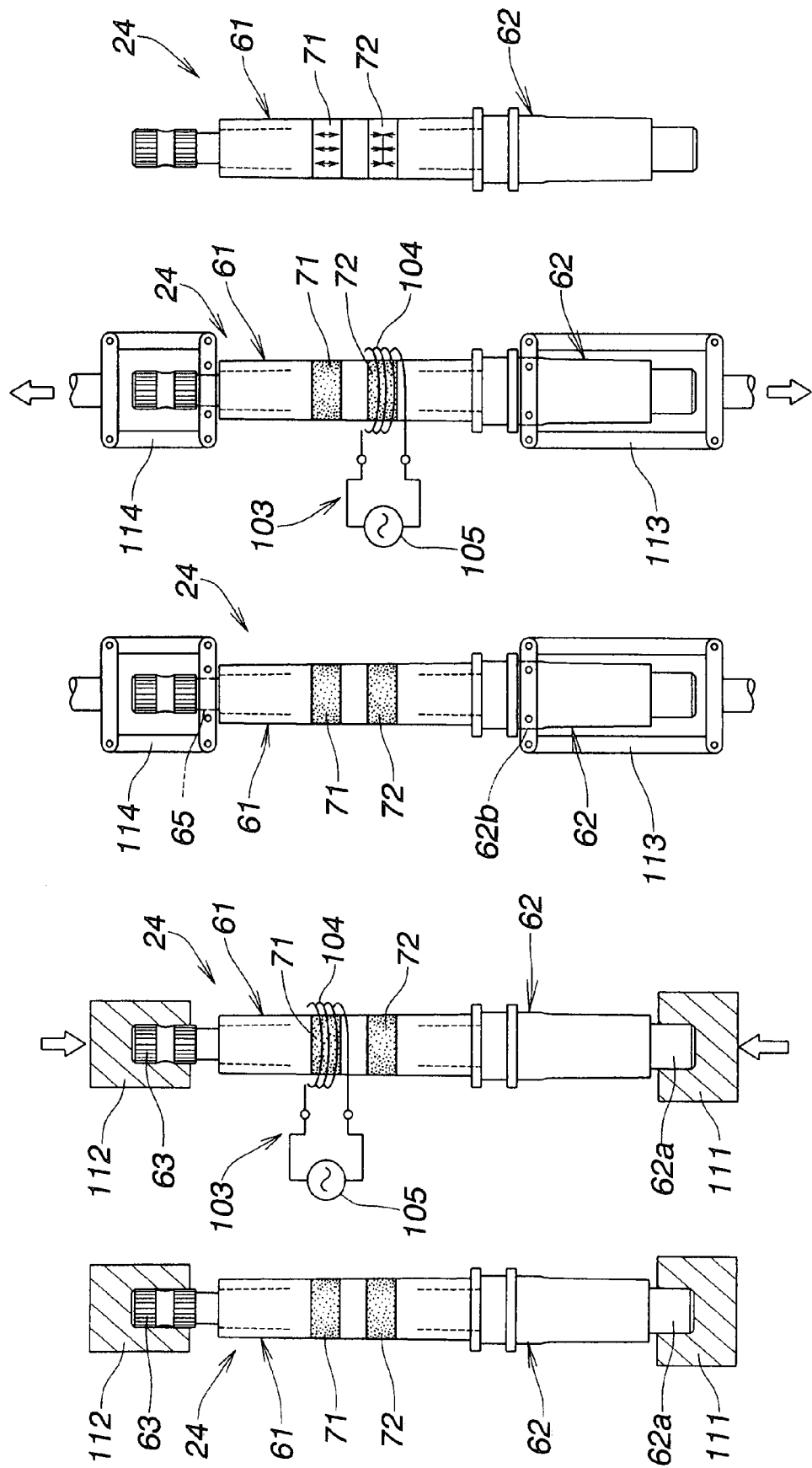

MAGNETOSTRICTIVE MECHANICAL QUANTITY SENSOR AND METHOD FOR MANUFACTURING SAME

FIELD OF THE INVENTION

The present invention relates to a magnetostrictive mechanical quantity sensor for detecting torque, axial force, and other so-called "mechanical quantities," as well as to a method of manufacture thereof. Axial force is force that acts in an axial direction.

BACKGROUND OF THE INVENTION

Torque sensors and axial-force sensors are varieties of mechanical quantity sensors. For example, there are many types of torque sensors for detecting torque acting on an axis of rotation. Magnetostrictive torque sensors having high precision and relatively simple configurations have become well-known in recent years, such as in JP-A-2001-133337 and JP-A-2004-309184.

The magnetostrictive torque sensors taught in JP-A-2001-133337 and JP-A-2004-309184 are provided to electric power steering apparatuses for use in vehicles and detect steering torque that is conveyed from a steering wheel to a torque-transmitting shaft (axis of rotation). A magnetostrictive film is formed on the outer perimeter surface of the torque-transmitting shaft. The change in magnetostriction that occurs in the magnetostrictive film in response to the steering torque is detected by the magnetostrictive torque sensor using an electrical coil and a magnetostriction-detection circuit, whereby the steering torque is detected.

Steering torque that is produced on the steering wheel is conveyed to the steered wheels via the torque-transmitting shaft, a rack-and-pinion mechanism, and a rack shaft. The torque-transmitting shaft is thus formed having a magnetostrictive film on the outer perimeter surface and a pinion (torque-transmitting part) of a rack-and-pinion mechanism on the end of the shaft.

A need has arisen for automotive vehicles that can be steered even when the engine has not been started. In this state, the steering torque for steering the wheels of the vehicle is larger than with normal steering. High steering torque is conveyed from the torque-transmitting shaft to the rack shaft via the rack-and-pinion mechanism. Rack-and-pinion mechanisms having a high mechanical strength are therefore needed. Specifically, various external forces caused by forces generated from a reaction with the road surface, as well as moderate external forces caused by driver steering act on the rack-and-pinion mechanism. The rack-and-pinion mechanism requires a mechanical strength that resists these external forces and allows the steering state to be maintained in those particular instances.

The pinion of the rack-and-pinion mechanism must adequately maintain the strength necessary to transmit steering torque exceeding normal levels to large loads. A variety of surface treatments are therefore frequently carried out on the pinion, such as carburization, induction hardening, other heat treatments, shot peening, and the like.

However, carrying out heat treatments on the pinion involves diffusing carbon components into the surface of the torque-transmitting shaft including the pinion. As a result, the surface of the torque-transmitting shaft is easily magnetized. Subjecting the pinion to shot peening and other surface-hardening treatments introduces residual compressive stress on the surface of the torque-transmitting shaft.

The magnetostrictive film formed on the outer perimeter surface of the torque-transmitting shaft is generally composed of a magnetostrictive plating of an Ni—Fe alloy film or the like. This kind of magnetostrictive plating is highly susceptible to the effects of magnetism from the torque-transmitting shaft and to the effects of strain on the torque-transmitting shaft.

Scope for improvement thus remains in regard to increasing the stability of the magnetostrictive properties of the magnetostrictive film when both a magnetostrictive film and a pinion (torque-transmitting part) are provided to the torque-transmitting shaft. Increasing the stability of the magnetostrictive properties is related to stabilizing the sensor signals of the magnetostrictive torque sensor.

This applies similarly to magnetostrictive axial-force sensors that have a shaft for transmitting axial force in order to convey axial forces to a load. Shafts for transmitting axial force are equivalent to the torque-transmitting shafts of magnetostrictive torque sensors. Scope for improvement remains in regard to increasing the stability of the magnetostrictive properties of the magnetostrictive film when both a magnetostrictive film and a part for transmitting axial force (the part that transmits axial force to a load) are provided to the shaft for transmitting axial force in a magnetostrictive axial-force sensor.

Accordingly, a technology is needed that can increase the stability of the magnetostrictive properties of the magnetostrictive film and that can provide both a magnetostrictive film and a torque-transmitting part to a torque-transmitting shaft, or both a magnetostrictive film and a part for transmitting axial force to a shaft for transmitting axial force, using processes optimized for each case.

SUMMARY OF THE INVENTION

According to a first aspect of the present invention, there is provided a magnetostrictive mechanical quantity sensor for detecting a torque or an axial force, which sensor comprises: an operation shaft upon which the torque or the axial force acts from an external origin; and a hollow shaft that has a magnetostrictive film formed on an outer perimeter surface, wherein the operation shaft is configured to be linked to and fit inside the hollow shaft.

The operation shaft and the hollow shaft are thus separate but interlinked members. A torque-transmitting part, for transmitting torque to a load, or a part for transmitting axial force, for transmitting axial force to a load, can be formed on the operation shaft when separated from the hollow shaft. Optimal surface treatments, such as carburization, other heat treatments, shot peening, and the like, can therefore be carried out on the operation shaft in order to fully ensure the strength necessary to transmit torque or axial force.

A magnetostrictive film is not formed on the operation shaft. Magnetostrictive films are formed by magnetostrictive plating, for example, but magnetostrictive plating is not carried out on the operation shaft. A magnetostrictive plating is not attached to the torque-transmitting part or the part for transmitting axial force of the operation shaft.

A magnetostrictive film can be formed in an optimal state on the outer perimeter surface of the hollow shaft via a magnetostrictive plating process or the like when removed from the operation shaft. Stabilization of the shaft material before magnetostrictive plating, heat treatments for stabilizing the magnetostrictive film, induction hardening or demagnetization in order to establish the magnetostrictive direction of the magnetostrictive film, and the like may be carried out under optimal conditions. The magnetostrictive film that is formed on the hollow shaft is not susceptible to the effects of magnetism from the operation shaft or to the effects of strain on the operation shaft.

The thermal refining required for the hollow shaft may be carried out on the hollow shaft separately from the operation shaft in order to ensure the mechanical properties necessary for torsional rigidity and the like.

Being a separate member from the operation shaft, the hollow shaft can therefore be produced by the following steps. First, a long, hollow material is prepared. A magnetostrictive film is then applied to a plurality of locations on the hollow material. Next, the hollow material is cut into sections of predetermined length to obtain a plurality of hollow shafts. The productivity of the hollow shaft can therefore be increased.

The operation shaft, upon which torque or axial force acts, and the hollow shaft, which has the magnetostrictive film formed on the outer perimeter surface, are configured so as to be linked and fit together as in the preceding explanation. A shaft that is composed of the combination of the hollow shaft and an operation shaft that is subjected to torque is called a torque-transmitting shaft. A shaft that is composed of the combination of the hollow shaft and an operation shaft that is subjected to axial force is called a shaft for transmitting axial force. A magnetostrictive film and a torque-transmitting part can both be formed on the torque-transmitting shaft by methods optimized for each case, and a magnetostrictive film and a part for transmitting axial force can both be formed on the shaft for transmitting axial force by methods optimized for each case.

The stability of the magnetostrictive properties of the magnetostrictive film can be adequately increased in both the torque-transmitting shaft and the shaft for transmitting axial force. By increasing the stability of the magnetostrictive properties, the sensor signals of the magnetostrictive mechanical quantity sensor can be adequately stabilized and the precision of detection can be increased.

As an example, the magnetostrictive mechanical quantity sensor according the first aspect of the present invention can be applied to a torque sensor and provided to an electric power steering apparatus for use in a vehicle. The steering torque, which is conveyed to the torque-transmitting shaft from the steering wheel, can be stably and precisely detected by the torque sensor in such instances. A supplementary torque is output from an electric motor in accordance with the stably and precisely detected steering torque. The steered wheels can be steered by the combined torque obtained by adding the supplementary torque to the steering torque. The steerability of the steering wheel can therefore be adequately increased.

The same effects will be exhibited when the magnetostrictive mechanical quantity sensor according to the first aspect of the present invention is provided to a steering apparatus for use in a vehicle that uses a steer-by-wire steering system, a four-wheel steering system, or another system other than an electric power steering apparatus for use in a vehicle.

A steer-by-wire steering system is a steering system wherein the steering mechanism for steering the steered wheels is mechanically separate from the steering wheel. According to this steering system, the amount of steering of the steering wheel is detected by the magnetostrictive mechanical quantity sensor, steering power is produced by a steering actuator in accordance with the amount of steering, and the steering power is conveyed to the steering mechanism, whereby the steered wheels are steered.

The magnetostrictive mechanical quantity sensor according to the first aspect of the present invention can be applied to an axial-force sensor and provided to, e.g., an electromotive braking system for use in a vehicle. The force with which the brakes are depressed, which is conveyed to the shaft for transmitting axial force from the vehicle brake pedal, can be stably and precisely detected by the axial-force sensor in such instances. An output torque is output from an electric motor in accordance with the stably and precisely detected brake-depressing force. The output force is converted into thrust. The thrust acts on the brake discs, whereby braking can be applied to the brake discs using an appropriate braking force.

Preferably, at least one of the operation shaft and the hollow shaft comprises a jig-mounting part which allows mounting of a jig that applies a predetermined added torque or added axial force when establishing a magnetostrictive direction of the magnetostrictive film.

According to a second aspect of the present invention, there is provided a method for manufacturing a magnetostrictive mechanical quantity sensor that has a magnetostrictive film on a surface of a torque-transmitting shaft upon which a torque acts from an external origin, which method comprises the steps of: preparing a hollow shaft, which has the magnetostrictive film applied to an outer perimeter surface, and an operation shaft, which fits into the hollow shaft; press-fitting the operation shaft into the hollow shaft and linking together the operation shaft and the hollow shaft, whereby the torque-transmitting shaft is manufactured; applying a predetermined added torque to at least one of the hollow shaft and the operation shaft, whereby the added torque is applied to the magnetostrictive film; heating the magnetostrictive film for a predetermined period of time while the added torque is applied; cooling the heated magnetostrictive film; and removing the applied added torque.

A torque-transmitting shaft is thus first manufactured by press-fitting an operation shaft, which has a torque-transmitting part, into a hollow shaft, which has a magnetostrictive film applied to the outer perimeter surface, and interlinking the operation shaft and the hollow shaft. Strain is generated on the magnetostrictive film that is subjected to the effects of linkage and press-fitting, and this strain remains in the magnetostrictive film.

Next, the magnetostrictive film is heated (subjected to a heat treatment) for a predetermined period of time while a predetermined added torque is applied to at least one of the operation shaft and the hollow shaft. After the heat treatment is completed, the magnetostrictive film is cooled to a temperature that is lower than the heating temperature, and the added torque that was applied to at least one of the operation shaft and the hollow shaft is removed.

The magnetostrictive film is thus heated for a predetermined period of time while an added torque is applied thereto, whereby creep is generated in the magnetostrictive film. Creep is a phenomenon wherein the strain of a material increases with the passage of time when the material is heated at a constant temperature while being subjected to a constant load (including torque).

In other words, creep that is generated due to heating the magnetostrictive film is utilized to reduce or remove residual strain in the magnetostrictive film. By heating the magnetostrictive film while applying an added torque, the creep can be used to impart permanent strain anew on the magnetostrictive film. The result is that the magnetostrictive direction of the magnetostrictive film can be accurately and easily tilted in the direction in which the added torque is applied.

Both the magnetostrictive film and the torque-transmitting part can thus be formed on the torque-transmitting shaft by the optimal methods for each case. Furthermore, the stability of the magnetostrictive properties of the magnetostrictive film can be adequately increased. By increasing the stability of the magnetostrictive properties, the sensor signals of the magnetostrictive mechanical quantity sensor (magnetostrictive torque sensor) can be adequately stabilized and the precision of detection can be increased.

Although the torque-transmitting shaft is manufactured by combining two members, the hollow shaft and the operation shaft, the following two treatments can be carried out simultaneously. The first treatment is for reducing or removing strain produced on the magnetostrictive film by linking and press-fitting the operation shaft to the hollow shaft. The second treatment is for establishing the magnetostrictive direction of the magnetostrictive film. The torque-transmitting shaft, which includes the magnetostrictive film that has adequately stabilized magnetostrictive properties, can therefore be readily manufactured in a small number of steps. As a result, the productivity of the magnetostrictive mechanical quantity sensor can be increased.

According to a third aspect of the present invention, there is provided a method for manufacturing a magnetostrictive mechanical quantity sensor that has magnetostrictive films on a surface of a torque-transmitting shaft upon which a torque acts from an external origin, which method comprises the steps of: preparing a hollow shaft, which has the magnetostrictive films applied to an outer perimeter surface and in two locations in a longitudinal direction of the shaft, and an operation shaft, which is fitted to the hollow shaft; press-fitting the operation shaft into the hollow shaft and linking together the operation shaft and the hollow shaft, whereby the torque-transmitting shaft is manufactured; applying a predetermined added torque between the two magnetostrictive films of the hollow shaft while both ends of the operation shaft are fixed in place, whereby the added torque is applied to the two magnetostrictive films; heating the two magnetostrictive films for a predetermined period of time while the added torque is applied; cooling the two heated magnetostrictive films; and removing the applied added torque.

A hollow shaft is thus first prepared that has magnetostrictive films applied to the outer perimeter surface and in two locations in the longitudinal direction of the shaft. An operation shaft, which has a torque-transmitting part, is press-fit into the hollow shaft, and the operation shaft and the hollow shaft are interlinked, whereby a torque-transmitting shaft is manufactured. Strain is generated on the magnetostrictive films that are subjected to the effects of linkage and press-fitting, and this strain remains in the magnetostrictive films.

Next, the magnetostrictive films are heated (subjected to a heat treatment) for a predetermined period of time while a predetermined added torque is applied between the two magnetostrictive films on the hollow shaft while both ends of the operation shaft are fixed in place. After the heat treatment is completed, the magnetostrictive films are cooled to a temperature that is lower than the heating temperature, and the added torque that was applied between the two magnetostrictive films is removed.

The magnetostrictive films are thus heated for a predetermined period of time while an added torque is applied thereto, whereby creep is generated in the magnetostrictive films.

In other words, creep that is generated due to heating the magnetostrictive films is utilized to reduce or remove residual strain in the magnetostrictive films. By heating the magnetostrictive films while applying an added torque, the creep can be used to impart a permanent strain anew on the magnetostrictive films. The result is that the magnetostrictive direction of the magnetostrictive films can be accurately and easily tilted in the direction in which the added torque is applied.

Both the magnetostrictive films and the torque-transmitting part can thus be formed on the torque-transmitting shaft by the optimal methods for each case. Furthermore, the stability of the magnetostrictive properties of the magnetostrictive films can be adequately increased. By increasing the stability of the magnetostrictive properties, the sensor signals of the magnetostrictive mechanical quantity sensor (magnetostrictive torque sensor) can be adequately stabilized and the precision of detection can be increased.

Although the torque-transmitting shaft is manufactured by combining two members, the hollow shaft and the operation shaft, the following two treatments can be carried out simultaneously. The first treatment is the treatment for reducing or removing strain produced on the magnetostrictive films by linking and press-fitting the operation shaft to the hollow shaft. The second treatment is the treatment for establishing the magnetostrictive direction of the magnetostrictive films. The torque-transmitting shaft, which includes the magnetostrictive films that have adequately stabilized magnetostrictive properties, can therefore be readily manufactured in a small number of steps. As a result, the productivity of the magnetostrictive mechanical quantity sensor can be increased.

According to a fourth aspect of the present invention, there is provided a method for manufacturing a magnetostrictive mechanical quantity sensor that has a magnetostrictive film on a surface of a shaft for transmitting axial force upon which an axial force acts from an external origin, which method comprises the steps of: preparing a hollow shaft, which has the magnetostrictive film applied to an outer perimeter surface, and an operation shaft, which fits into the hollow shaft; press-fitting the operation shaft into the hollow shaft and linking together the operation shaft and the hollow shaft, whereby the shaft for transmitting axial force is manufactured; applying a predetermined compressive force or tensile force to at least one of the hollow shaft and the operation shaft, whereby the compressive force or the tensile force is applied to the magnetostrictive film; heating the magnetostrictive film for a predetermined period of time while the compressive force or the tensile force is applied; cooling the heated magnetostrictive film; and removing the applied compressive force or tensile force.

A shaft for transmitting axial force is thus first manufactured by press-fitting an operation shaft, which has a torque-transmitting part, into a hollow shaft, which has a magnetostrictive film applied to the outer perimeter surface, and interlinking the operation shaft and the hollow shaft. Strain is generated on the magnetostrictive film that is subjected to the effects of linkage and press-fitting, and this strain remains in the magnetostrictive film.

Next, the magnetostrictive film is heated (subjected to a heat treatment) for a predetermined period of time while a previously established compressive force or tensile force is applied to at least one of the operation shaft and the hollow shaft. After the heat treatment is completed, the magnetostrictive film is cooled to a temperature that is lower than the heating temperature, and the compressive force or tensile force that was applied to at least one of the operation shaft and the hollow shaft is removed.

The magnetostrictive film is thus heated for a predetermined period of time while a compressive force or tensile force is applied thereto, whereby creep is generated in the magnetostrictive film.

In other words, creep that is generated due to heating the magnetostrictive film is utilized to reduce or remove residual strain in the magnetostrictive film. By heating the magnetostrictive film while applying a compressive force or tensile force, the creep can be used to impart a permanent strain anew on the magnetostrictive film. The result is that the magnetostrictive direction of the magnetostrictive film can be accurately and easily tilted in the direction in which the compressive force or tensile force is applied.

Both the magnetostrictive film and the part for transmitting axial force can thus be formed on the shaft for transmitting axial force by the optimal methods for each case. Furthermore, the stability of the magnetostrictive properties of the magnetostrictive film can be adequately increased. By increasing the stability of the magnetostrictive properties, the sensor signals of the magnetostrictive mechanical quantity sensor (magnetostrictive axial-force sensor) can be adequately stabilized and the precision of detection can be increased.

Although the shaft for transmitting axial force is manufactured by combining two members, the hollow shaft and the operation shaft, the following two treatments can be carried out simultaneously. The first treatment is the treatment for reducing or removing strain produced on the magnetostrictive film by linking and press-fitting the operation shaft to the hollow shaft. The second treatment is the treatment for establishing the magnetostrictive direction of the magnetostrictive film. The shaft for transmitting axial force, which includes the magnetostrictive film that has adequately stabilized magnetostrictive properties, can therefore be readily manufactured in a small number of steps. As a result, the productivity of the magnetostrictive mechanical quantity sensor (magnetostrictive axial-force sensor) can be increased.

BRIEF DESCRIPTION OF THE DRAWINGS

Certain preferred embodiments of the present invention will be described in detail below, by way of example only, with reference to the accompanying drawings, in which:

FIGS. 4A to 4D are schematic views showing the torque-transmitting shaft of FIG. 3 in assembled and disassembled states;

FIG. 5 is a circuit diagram of the magnetostrictive mechanical quantity sensor shown in FIG. 3;

FIGS. 6A to 6E are schematic views illustrating a first method for manufacturing a torque-transmitting shaft, according to the present invention;

FIGS. 7A to 7C are schematic views illustrating a second method for manufacturing a torque-transmitting shaft, according to the present invention; and FIGS. 8A to 8E are schematic views illustrating a method for manufacturing an axial-force-transmitting shaft according to the present invention.

DESCRIPTION OF THE PREFERRED EMBODIMENTS

A description shall be given using, by way of example, a magnetostrictive mechanical quantity sensor provided to an electric power steering apparatus for use in a vehicle. However, [the present invention] is not limited to configurations involving electric power steering apparatuses for use in vehicles.

Figure 1:
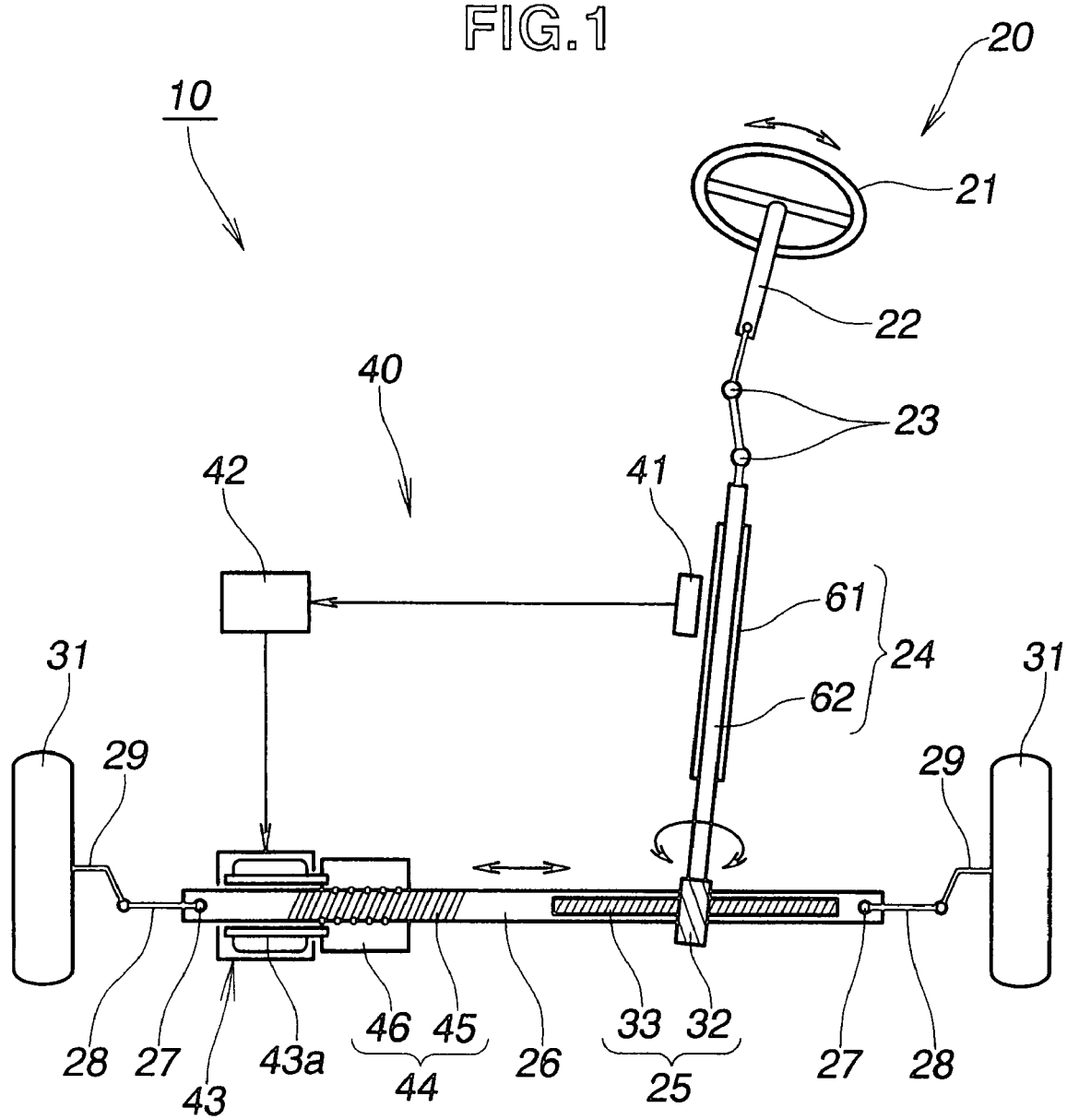
FIG. 1 is a schematic view illustrating an electric power steering apparatus that is provided with a magnetostrictive mechanical quantity sensor of the present invention.

FIGS. 1 through 5 show an electric power steering apparatus employing a magnetostrictive mechanical quantity sensor of the present invention. As shown in FIG. 1, an electric power steering apparatus 10 for use in a vehicle is comprised of: a steering system 20 that extends from a vehicle steering member 21 to steered wheels 31, 31 of the vehicle; and a supplementary torque mechanism 40 for applying a supplementary torque to the steering system 20.

The steering member 21 is comprised of, e.g., a steering wheel (the steering member 21 is referred to below as "steering wheel 21" for convenience). The steered wheels 31, 31 are, e.g., the left and right front wheels.

The steering system 20 is composed of: the steering wheel 21; a torque-transmitting shaft 24 that is linked to the steering wheel 21 by a steering shaft 22 and universal joints 23, 23; a rack shaft 26 linked to the torque-transmitting shaft 24 by a rack-and-pinion mechanism 25; and the left and right steered wheels 31, 31 linked by ball joints 27, 27 on both ends of the rack shaft 26, tie rods 28, 28, and knuckles 29, 29.

The rack-and-pinion mechanism 25 is comprised of a pinion 32, which is formed on the torque-transmitting shaft 24, and a rack 33, which is formed on the rack shaft 26.

The electric power steering apparatus 10 thus transmits steering torque, which corresponds to the steering of the steering wheel 21 by a driver, to the rack shaft 26 via the torque-transmitting shaft 24 and the rack-and-pinion mechanism 25, whereby the steered wheels 31, 31 are steered via the rack shaft 26.

The supplementary torque mechanism 40 is composed of a magnetostrictive torque sensor 41 (magnetostrictive mechanical quantity sensor 41), a control part 42, an electric motor 43, and a ball screw 44. The magnetostrictive torque sensor 41 detects the steering torque of the steering system 20 applied to the steering wheel 21. The control part 42 generates control signals based on torque-output signals of the magnetostrictive torque sensor 41.

The electric motor 43 generates motor torque (supplementary torque) in accordance with the steering torque based on the control signals of the control part 42. A motor shaft 43a of the electric motor 43 is composed of a hollow shaft that surrounds the rack shaft 26.

The ball screw 44 is a power-transmitting mechanism for transmitting the motor torque to the rack shaft 26 and is composed of a screw part 45, a nut 46, and several balls. The screw part 45 is formed on a portion of the rack shaft 26 other than the rack 33. The nut 46 is a rotating member in which the screw part 45 is installed with the numerous balls interposed therebetween, and is also linked to the motor shaft 43a.

In the electric power steering apparatus 10, steering torque that is conveyed to the torque-transmitting shaft 24 is detected by the magnetostrictive torque sensor 41, a motor torque is produced by the electric motor 43 in accordance with the steering torque, and the motor torque can be transmitted to the rack shaft 26. The steered wheels 31, 31 are steered via the rack shaft 26 by the combined torque, which adds the motor torque that was produced by the electric motor 43 to the steering torque.

Figure 2:
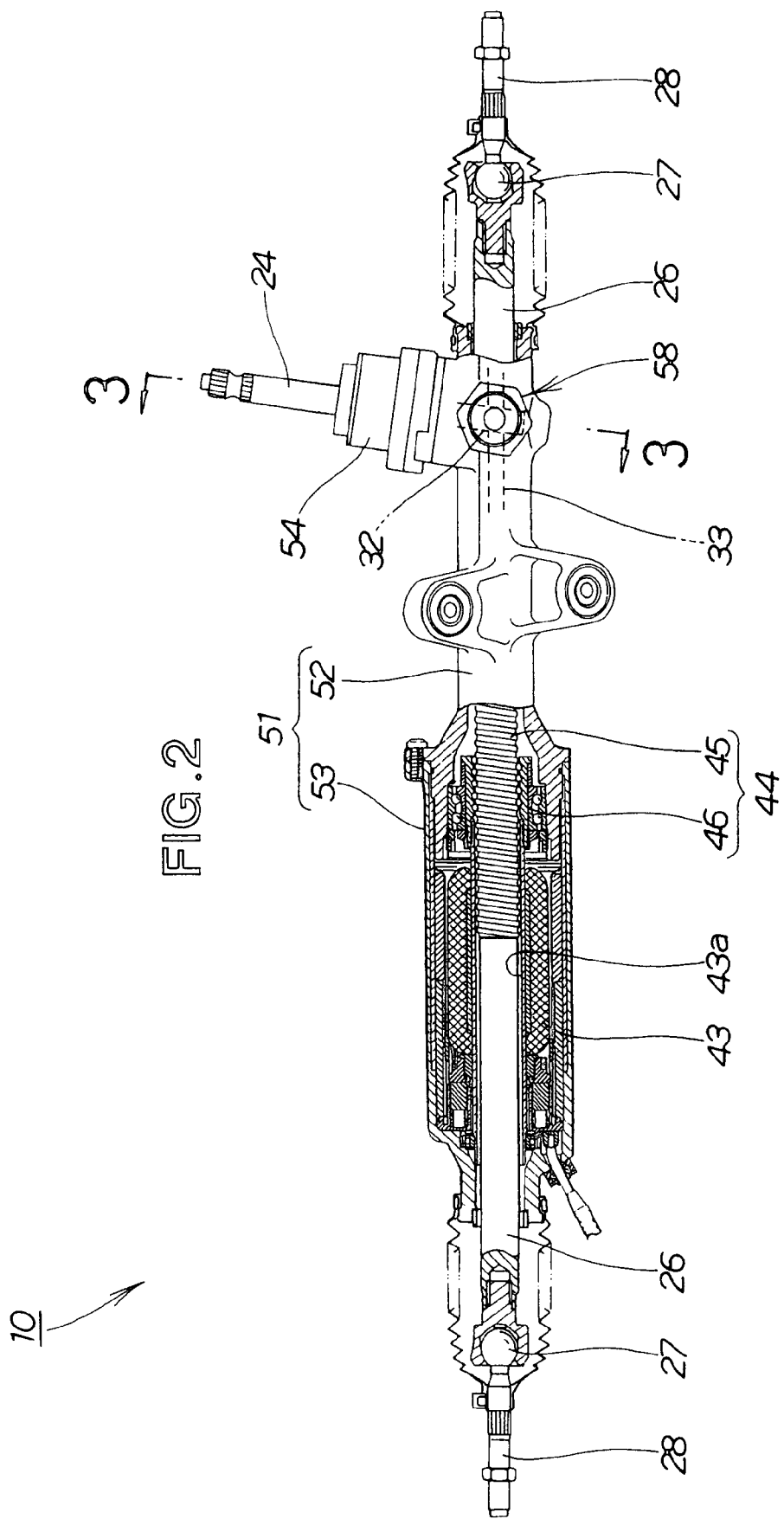
FIG. 2 is a schematic view illustrating, partially in section, details of the electric motor, the torque-transmitting shaft, and the rack shaft shown in FIG. 1.

The rack shaft 26 is stored in a housing 51 that extends in the widthwise direction of the vehicle (the lateral direction), as shown in FIG. 2. The housing 51 has a substantially tubular shape. The end surfaces of a first housing 52 and a second housing 53 are joined by bolts, whereby an elongated gear box is assembled. The second housing 53 acts as the motor case of the electric motor 43.

Figure 3:
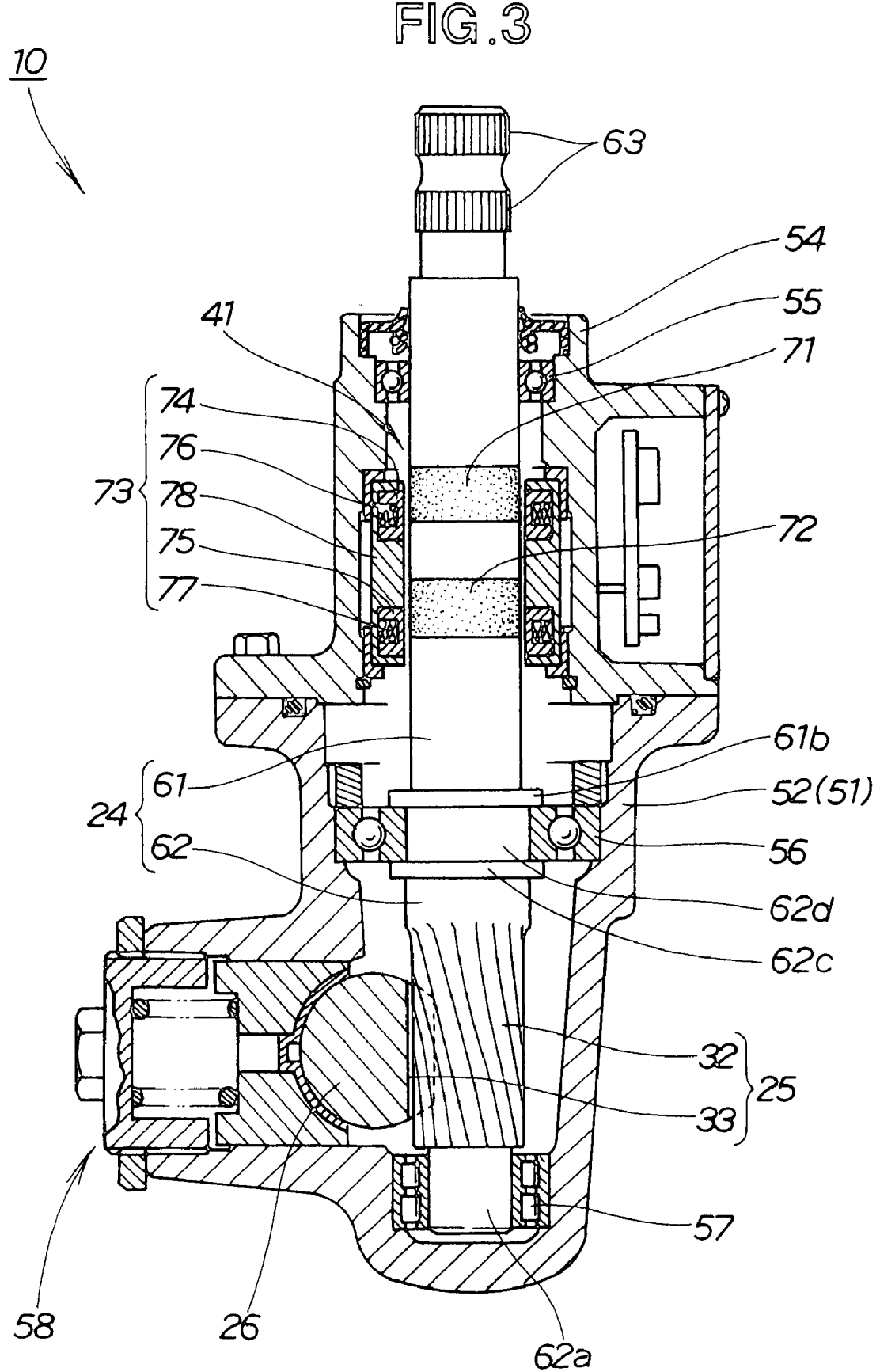
FIG. 3 is a sectional view taken along line 3-3 of FIG. 2.

The torque-transmitting shaft 24, the rack-and-pinion mechanism 25, the magnetostrictive torque sensor 41, the electric motor 43, and the ball screw 44 are stored in the housing 51, shown in FIGS. 2 and 3. An upper opening of the first housing 52 is sealed shut by a lid 54. The upper-end part, the longitudinally-central part, and the lower-end part of the torque-transmitting shaft 24 are rotatably supported in the first housing 52 via three upper and lower bearings 55, 56, 57.

The first housing 52 is provided with a rack guide 58. The rack guide 58 slidably supports the rack shaft 26 in the axial direction while regulating the movement of the rack shaft 26 in the longitudinal direction of the torque-transmitting shaft 24 and in the direction in which the meshing of the pinion 32 and the rack 33 is released.

Figure 4A:
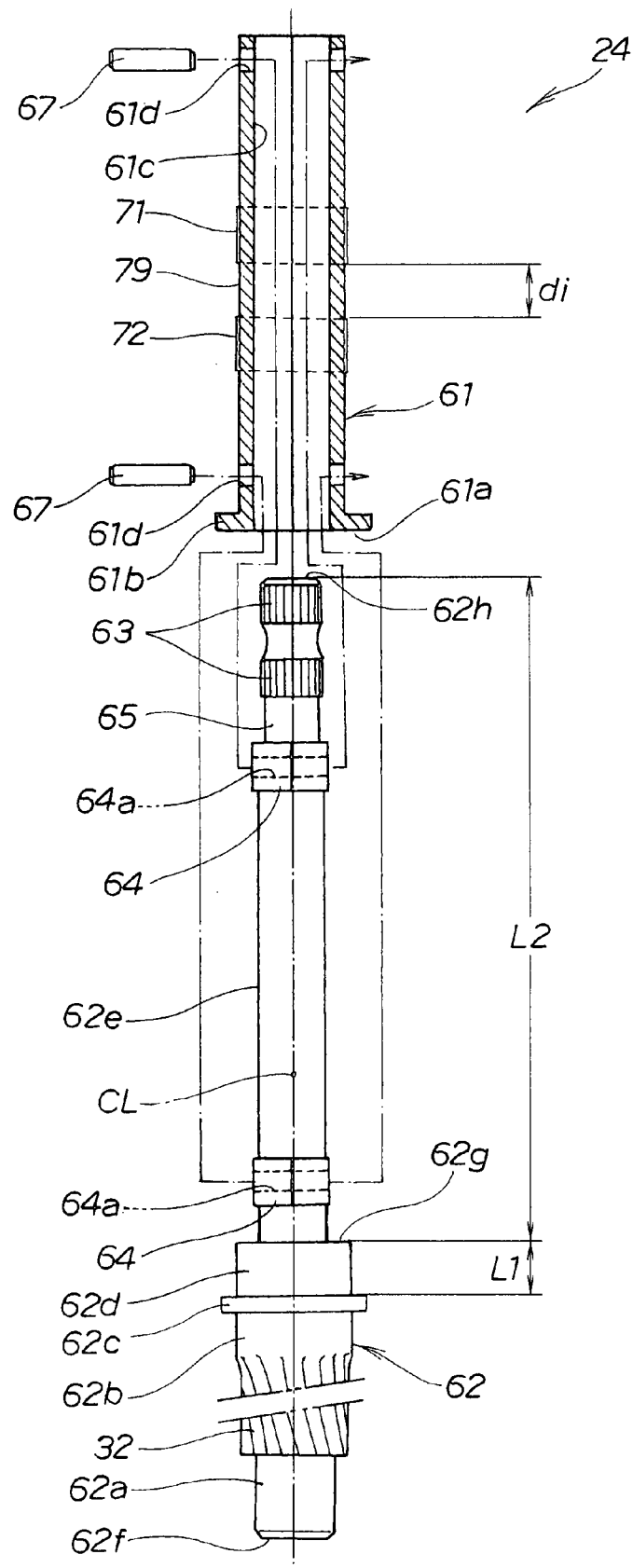

Next, the torque-transmitting shaft 24 will be described in detail based on FIG. 3 and FIGS. 4A through 4D. FIG. 4A shows the disassembled torque-transmitting shaft 24. FIG. 4B shows the cross-sectional configuration of the torque-transmitting shaft 24 when assembled. FIG. 4C shows the cross-sectional configuration along the line 4C-4C of FIG. 4B. FIG. 4D shows the exterior of the assembled torque-transmitting shaft 24.

The torque-transmitting shaft 24 is composed of a torque shaft 61 and a pinion shaft 62 (operation shaft 62), as shown in FIGS. 3, 4A, and 4B. The torque shaft 61 and the pinion shaft 62 are configured as mutually separate members and are arranged coaxially (on the axis CL of the torque-transmitting shaft 24). The torque shaft 61 and the pinion shaft 62 are also fit and linked together, and thereby integrally assembled.

The torque shaft 61 and the pinion shaft 62 are composed of ferromagnetic materials or other magnetic substances. Iron and steel (including nickel-chromium-molybdenum steel materials) are examples of ferromagnetic materials.

To be more specific, two magnetostrictive films 71, 72 of the magnetostrictive torque sensor 41 (see FIG. 3) are formed on the outer perimeter surface of the torque shaft 61, as shown in FIG. 4A. The first magnetostrictive film 71 may be referred to as "the first residual strain part 71," and the second magnetostrictive film 72 may be referred to as "the second residual strain part 72."

The torque shaft 61 has a substantially hexagonal flange part 61b on an end 61a and is composed of a hollow shaft that has a receiving hole 61c (hollow part 61c) formed on the axis CL. As shown in FIG. 4C, the receiving hole 61c is a through-hole that has a polygonal (e.g., a true-hexagonal) cross section that is perpendicular to the axis CL.

The torque shaft 61 has a pin hole 61d near each end. The two pin holes 61d, 61d are perpendicular to the axis CL and are through-holes that pass through the axis CL. The pin holes 61d, 61d also pass through the receiving hole 61c. The second magnetostrictive film 72 is positioned near the flange part 61b.

The pinion shaft 62 comprises a solid shaft on which is formed a supported part 62a, a jig-mounting part 62b, a flange part 62c, a supported part 62d, and a fitting-shaft part 62e, as shown in FIG. 4A.

The supported part 62a, the pinion 32, the jig-mounting part 62b, the flange part 62c, the supported part 62d, and the fitting-shaft part 62e are arranged in the order indicated from the end 62f of the pinion shaft 62 to the other end and are all on the axis CL.

The supported part 62a is rotatably supported by the bearing 57 (see FIG. 3).

The jig-mounting part 62b is a component for attaching a jig described hereinafter.

The supported part 62d is rotatably supported by the bearing 56 (see FIG. 3). The length of the supported part 62d is L1. Specifically, the distance from the substantially circular flange part 62c to the end 62g of the supported part 62d (the base end 62g of the fitting-shaft part 62e) is L1. The diameter of the supported part 62d is established to be larger than the diameter of the receiving hole 61c.

The fitting-shaft part 62e is longer than the full length of the torque shaft 61, and the distance from the base end 62g to the distal end 62h is L2. The fitting-shaft part 62e passes through the receiving hole 61c of the torque shaft 61 and has a linking part 63, which protrudes from the receiving hole 61c, on the distal part. The linking part 63 links to a universal joint 23 (see FIG. 1) and is, e.g., serrated.

The fitting-shaft part 62e has two fitting-flange parts 64, 64, which are each formed near one longitudinal end, and a jig-mounting part 65, which is formed between the fitting-flange part 64 and the linking part 63. The jig-mounting part 65 mounts a jig that will be described hereinafter.

As shown in FIG. 4C, the fitting-flange parts 64, 64 are ring-shaped members that are formed having the same cross-sectional shape as the receiving hole 61c and protrude so as to encircle the outer circumference of the fitting-shaft part 62e. The fitting-flange parts 64, 64 have two pin holes 64a, 64a that pass through in the direction perpendicular to the fitting-shaft part 62e. The locations of the pin holes 64a, 64a are established to correspond to the respective pin holes 61d, 61d of the torque shaft 61.

The fit system of the fitting-flange parts 64, 64 of the pinion shaft 62 relative to the receiving hole 61c is an "interference fit." Interference fit is a fit in which interference is always possible when a hole and a shaft are assembled, i.e., a fit system wherein the maximum diameter of the hole is smaller than, or, in extreme instances, equal to the minimum diameter of the shaft. "Interference" is the difference of the diameter of the hole relative to the diameter of the shaft before being joined, wherein the diameter of the shaft is larger than the diameter of the hole.

The interference between the fitting-flange parts 64, 64 and the receiving hole 61c is established as necessary to obtain an optimal value. The fitting-flange parts 64, 64 are fit into the receiving hole 61c, whereby a constant radial load is added to the torque shaft 61. Dispersion of the magnetostrictive properties of the magnetostrictive films 71, 72 can be regulated by this load. A circular shape is preferable for the cross sections of the receiving hole 61c and the fitting-flange parts 64, 64 in this case.

The procedure for assembling the torque shaft 61 and the pinion shaft 62 is as follows.

First, preparatory holes are formed at the locations of the pin holes 61d, 61d of the torque shaft 61, as shown in FIG. 4A. Neither the pin holes 64a, 64a nor preparatory holes for the pin holes 64a, 64a should be formed in the fitting-shaft part 62e at this point.

Next, the bearing 56 (see FIG. 3) is fit into the supported part 62d, and an end surface of the inner ring of the bearing 56 is brought into contact with the end surface of the flange part 62c. The bearing 56 can thereby be attached to the pinion shaft 62.

Next, the fitting-flange parts 64, 64 are fit into the receiving hole 61c while the fitting-shaft part 62e is passed through. The end surface of the flange part 61b is brought into contact with the other end surface of the inner ring of the bearing 56. The result is that both ends of the inner ring of the bearing 56 are sandwiched by the two flange parts 61b, 62c, as shown in FIGS. 3 and 4B.

Next, the pin holes 61d, 61d are formally formed through the torque shaft 61 at the locations of the previously formed preparatory holes once the fitting-flange parts 64, 64 are fit into the receiving hole 61c. The pin holes 61d, 61d are formed through the torque shaft 61, whereby the pin holes 64a, 64a are also formed in the fitting-flange parts 64, 64 at the same time. The diameters of the pin holes 61d, 61d, 64a, 64a are slightly larger than the diameters of the preparatory holes.

Next, pins 67, 67 are press-fit into the pin holes 61d, 61d, 64a, 64a. The torque shaft 61 and the pinion shaft 62 are thereby integrally linked together by the pins 67, 67, whereby the assembly of the torque-transmitting shaft 24 is completed. The ends of the inner ring of the bearing 56 are sandwiched by the two flange parts 61b, 62c. The bearing 56 is inserted into the torque-transmitting shaft 24. The bearing 56 will not be dislodged from the torque-transmitting shaft 24. The process of assembling the torque-transmitting shaft 24 is thereby completed.

The relative rotation and relative axial displacement of the thus-assembled torque shaft 61 and the pinion shaft 62 are regulated with respect to one another. The pinion shaft 62 may be a hollow shaft rather than a solid shaft in order to reduce the weight thereof.

Steering torque, which is conveyed from the steering wheel 21 (see FIG. 1) to the pinion shaft 62 via the linking part 63, is also transmitted from the pinion shaft 62 to the torque shaft 61 via the pins 67, 67.

The receiving hole 61c and the fitting-flange parts 64, 64 have polygonal cross sections. Steering torque is also transmitted from the torque shaft 61 to the pinion shaft 62 via these polygonal fitting parts.

The cross section of the receiving hole 61c and the fitting-flange parts 64, 64 is not limited to a polygonal shape but may also be circular. A circular cross section allows for simplified manufacturing, fitting, and controlling the precision of fitting.

Next, the magnetostrictive torque sensor 41 will be described in detail. The magnetostrictive torque sensor 41 is a type of magnetostrictive mechanical quantity sensor. Torque is the mechanical quantity that is detected by the magnetostrictive torque sensor 41.

The magnetostrictive torque sensor 41 is composed of the first and second residual strain parts 71, 72 and a detection part 73, as shown in FIG. 3. The first and second residual strain parts 71, 72 are imparted with residual strain and are provided to the surface of the torque-transmitting shaft 24. The magnetostrictive properties of the first and second residual strain parts 71, 72 change in accordance with torque acting from an external origin. The detection part 73, which is provided surrounding the first and second residual strain parts 71, 72, electrically detects the magnetostrictive effects produced in the first and second residual strain parts 71, 72 and outputs detection signals. The detection signals are torque-detection signals.

To be more specific, the first and second residual strain parts 71, 72 are a pair of magnetically anisotropic members that are imparted with residual strain in mutually opposing directions in the longitudinal direction of the torque shaft 61, as shown in FIGS. 3 and 4A. In other words, the first and second residual strain parts 71, 72 are composed of magnetostrictive films that are formed on the outer perimeter surface (the axial outer perimeter surface, the surface) of the torque shaft 61.

The first and second magnetostrictive films 71, 72 (the first and second residual strain parts 71, 72) are composed of plating layers of substantially fixed width that are formed across the entire circumference of the torque shaft 61 in two locations thereon. The magnetostrictive directions of the first and second magnetostrictive films 71, 72 are in mutual opposition. A predetermined gap di is present between the first magnetostrictive film 71 and the second magnetostrictive film 72 in the longitudinal direction of the torque shaft 61.

It shall be apparent that a non-magnetostrictive part 79 completely devoid of magnetostrictive film is present on the outer perimeter surface of the torque shaft 61 between the first magnetostrictive film 71 and the second magnetostrictive film 72. The two magnetostrictive films 71, 72 may also be a single, continuous magnetostrictive film.

The two magnetostrictive films 71, 72 are composed of materials having a magnetic flux whose density changes enormously in response to changes in strain. The magnetostrictive films 71, 72 are, e.g., films of Ni—Fe alloy formed by vapor plating on the outer perimeter surface of the torque shaft 61. The thickness of the alloy film is preferably approximately 5 to 20 μm. The thickness of the alloy film may also be more than or less than 5 to 20 μm. The magnetostrictive direction of the second magnetostrictive film 72 is different from the magnetostrictive direction of the first magnetostrictive film 71. In other words, the two magnetostrictive films 71, 72 are magnetically anisotropic.

The magnetostriction constant of the Ni—Fe alloy film increases when the Ni content is approximately 20 wt % or approximately 50 wt %, and therefore the magnetostrictive effect is also increased. An Ni—Fe alloy material should therefore preferably be used that has an Ni content of approximately 20 wt % or approximately 50 wt %. A material that has, e.g., 50 to 60 wt % Ni, with the remainder being Fe, is used as the Ni—Fe alloy film. The magnetostrictive film may also be a ferromagnetic film, or a film of Permalloy (approx. 78 wt % Ni, remainder Fe), or Supermalloy (78 wt % Ni, 5 wt % Mo, remainder Fe). Ni is nickel, Fe is iron, and Mo is molybdenum.

The detection part 73 is composed of: cylindrical coil bobbins 74, 75 that pass through the torque shaft 61; a first multilayer-solenoid coil 76 and a second multilayer-solenoid coil 77 that are wrapped on the coil bobbins 74, 75; and a back yoke 78 for magnetic shielding that surrounds the first and second multilayer-solenoid coils 76, 77.

The first and second multilayer-solenoid coils 76, 77 are detection coils. The first multilayer-solenoid coil 76 will be referred to below as the first detection coil 76, and the second multilayer-solenoid coil 77 will be referred to as the second detection coil 77. The first detection coil 76 is wrapped around the space that encircles the first residual strain part 71, and the second detection coil 77 is wrapped around the space that encircles the second residual strain part 72.

The detection part 73 also has first and second conversion circuits 81, 82 and a torque signal-output circuit 83, as shown in FIG. 5. The first conversion circuit 81 rectifies, amplifies, and converts the detection signals of the first detection coil 76 and outputs the detection signals as a detection voltage VT1. The second conversion circuit 82 rectifies, amplifies, and converts the detection signals of the second detection coil 77 and outputs the detection signals as a detection voltage VT2. The torque signal-output circuit 83 calculates and outputs the detection voltages VT1, VT2 as a torque-detection voltage VT3.

The operation of the detection part 73 is as follows. The first and second detection coils 76, 77 detect torsion generated on the torque shaft 61 in accordance with the steering torque and produce detection signals. These detection signals are output from the first and second conversion circuits 81, 82 as the detection voltages VT1, VT2. The detection voltages VT1, VT2 are output from the torque signal-output circuit 83 as the torque-detection voltage VT3. The torque-detection voltage VT3 is the torque-detection signal (steering-torque signal).

The description of the magnetostrictive torque sensor 41 is summarized following. The torque shaft 61 includes the magnetostrictive films 71, 72 that are imparted with strain. When the magnetostrictive films 71, 72 are acted on by a torque via the torque shaft 61, the magnetic permeability of the magnetostrictive films 71, 72 changes in accordance with the torque.

The impedance (the induced voltage or detection voltage) of the first and second detection coils 76, 77 changes in accordance with the change in magnetic permeability. The change in impedance is detected, whereby the direction and magnitude of the torque acting on the torque shaft 61 is detected.

The above description will be summarized following, wherein the torque shaft 61 may be referred to as "the hollow shaft 61," and the pinion shaft 62 may be referred to as "the solid shaft 62," "the operation shaft 62," or "the rotating shaft 62."

The solid shaft 62 and the hollow shaft 61 are mutually separate members that are linked together, as shown in FIGS. 4A through 4D. The solid shaft 62 transmits torque acting from the outside to loads 31, 31 (the steered wheels 31, 31 shown in FIG. 1). The hollow shaft 61 has the magnetostrictive films 71, 72 formed on the outer perimeter surface.

The torque-transmitting part 32 (the pinion 32 or the like) for transmitting torque to the loads 31, 31 can be formed on the solid shaft 62 when separated from the hollow shaft 61. Carburization, other heat treatments, shot peening, and other optimal surface treatments can therefore be carried out on the solid shaft 62 in order to fully ensure the strength necessary to transmit torque.

The magnetostrictive films 71, 72 are not formed on the solid shaft 62. The magnetostrictive films 71, 72 are formed by magnetostrictive plating, but magnetostrictive plating is not carried out on the solid shaft 62. A magnetostrictive plating is not attached to the torque-transmitting part 32 of the solid shaft 62.

On the other hand, the magnetostrictive films 71, 72 can be formed in an optimal state on the outer perimeter surface of the hollow shaft 61 via a magnetostrictive plating process or the like when removed from the solid shaft 62. Stabilization of the shaft material before magnetostrictive plating, heat treatments for stabilizing the magnetostrictive films 71, 72, induction hardening or demagnetization in order to establish the magnetostrictive direction of the magnetostrictive films 71, 72, and the like may be carried out under optimal conditions. The magnetostrictive films 71, 72 that are formed on the hollow shaft 61 are resistant to (or are not subject to) the effects of magnetism from the solid shaft 62 or to the effects of strain on the solid shaft 62.

The thermal refining required for the hollow shaft 61 may be carried out on the hollow shaft 61 separately from the solid shaft 62 in order to ensure the mechanical properties necessary for torsional rigidity and the like.

Both the magnetostrictive films 71, 72 and the torque-transmitting part 32 can thus be formed on the torque-transmitting shaft 24 by the optimal methods for each case. Furthermore, the stability of the magnetostrictive properties of the magnetostrictive films 71, 72 can be adequately increased. By increasing the stability of the magnetostrictive properties, the sensor signals of the magnetostrictive torque sensor 41 can be adequately stabilized and the precision of detection can be increased.

This magnetostrictive torque sensor 41 can be provided to the electric power steering apparatus 10 shown in FIG. 1 for use in a vehicle. The steering torque, which is conveyed to the torque-transmitting shaft 24 from the steering wheel 21, can be stably and precisely detected by the magnetostrictive torque sensor 41 in such instances. A supplementary torque is output from the electric motor 43 in accordance with the stably and precisely detected steering torque. The steered wheels 31, 31 can be steered by the combined torque obtained by adding the supplementary torque to the steering torque. The steerability of the steering wheel 21 can therefore be adequately increased.

The hollow shaft 61 includes the receiving hole 61c, which passes through the entire longitudinal length thereof, and therefore makes it possible to minimize effects on the magnetostrictive films 71, 72 from the interior of the shaft, e.g., dispersion and other effects of heat treatment and magnetization.

The hollow shaft 61 is a member that is separate from the operation shaft 62. The hollow shaft 61, which includes the plurality of the magnetostrictive films 71, 72, can therefore be mass-produced by the following two manufacturing methods. The number of manufacturing steps can be greatly reduced and the productivity of the hollow shaft 61 can therefore be increased, resulting in decreased costs.

In the first manufacturing method, first a long, hollow material is prepared that has a receiving hole 61c. The magnetostrictive films are then applied to a plurality of locations on the hollow material. Next, the hollow material is cut into sections of predetermined length to obtain a plurality of hollow shafts 61.

In the second manufacturing method, first a long, hollow material is prepared that has a receiving hole 61c. A magnetostrictive film is then formed on the entire outer perimeter surface of the hollow material. Next, the hollow material is cut into sections of predetermined length. The magnetostrictive films on the cut hollow material are then imparted with anisotropy at the desired locations to obtain a plurality of hollow shafts 61.

The same effects will be exhibited when the magnetostrictive torque sensor 41 having the above configuration is provided to a steering apparatus for use in a vehicle that uses a steer-by-wire steering system, a four-wheel steering system, or another system other than the aforementioned electric power steering apparatus 10 for use in a vehicle.

A steer-by-wire steering system is a steering system wherein the steering mechanism (the torque-transmitting shaft 24 and the rack shaft 26) for steering the steered wheels 31, 31 is mechanically separate from the steering wheel 21 in FIG. 1.

Specifically, a steer-by-wire steering system has the following configuration. A steering-angle sensor and an actuator are further provided. The steering-angle sensor detects the amount of steering of the steering wheel 21 in FIG. 1. The actuator produces driving torque in accordance with the amount of steering and conveys the torque to the torque-transmitting shaft 24. The magnetostrictive torque sensor 41 detects the driving torque conveyed to the torque-transmitting shaft 24 from the actuator.

The magnetostrictive torque sensor (magnetostrictive mechanical quantity sensor) 41 having the above configuration can also be applied to a magnetostrictive axial-force sensor for detecting axial force. The configuration of a magnetostrictive axial-force sensor is substantially the same as the afore-described magnetostrictive torque sensor 41.

To be more specific, applying the magnetostrictive torque sensor 41 to a magnetostrictive axial-force sensor involves making the torque-transmitting shaft 24, the torque shaft 61, and the pinion shaft 62 into, respectively, a "shaft 24 for transmitting axial force," a hollow "axial-force shaft 61," and a solid or hollow "transmission shaft 62," as shown in FIG. 3 and FIGS. 4A through 4D. In other words, the shaft 24 for transmitting axial force is constructed by combining the axial-force shaft 61 and the transmission shaft 62.

The magnetostrictive torque sensor 41 will be described below as a "magnetostrictive axial-force sensor 41." The magnetostrictive axial-force sensor 41 is a type of magnetostrictive mechanical quantity sensor. The axial-force shaft 61 may be referred to as "the hollow shaft 61," and the transmission shaft 62 may be referred to as "the solid shaft 62" or "the operation shaft 62."

To be more specific, the magnetostrictive axial-force sensor 41 is composed of the transmission shaft 62, the axial-force shaft 61, and the detection part 73, as shown in FIG. 3 and FIGS. 4A through 4D. The axial-force shaft 61 has the magnetostrictive films 71, 72 formed on the outer perimeter surface. The transmission shaft 62 is subject to axial force acting from outside. The transmission shaft 62 is configured to be linked to and fit inside the axial-force shaft 61. The detection part 73 electrically detects the magnetostrictive effects produced in the magnetostrictive films 71, 72 whereby axial force is detected.

The magnetostrictive mechanical quantity sensor 41 can thus be applied to a magnetostrictive axial-force sensor and provided to, e.g., an electromotive braking system for use in a vehicle. The force with which the brakes are depressed which is conveyed to the shaft 24 for transmitting axial force from the vehicle brake pedal can be stably and precisely detected by the magnetostrictive axial-force sensor 41 in such instances. An output torque is output from an electric motor in accordance with the stably and precisely detected brake-depressing. The output force is converted into thrust. The thrust acts on the brake discs, whereby braking can be applied to the brake discs using an appropriate braking force.

Next, a method for manufacturing the magnetostrictive torque sensor 41 (magnetostrictive mechanical quantity sensor 41), and, in particular, a method for manufacturing the torque-transmitting shaft 24 will be described.

A first method for manufacturing the torque-transmitting shaft 24 involves manufacture via the steps shown in FIGS. 4A through 4D and FIGS. 6A through 6E. FIGS. 6A to 6E show the first method for manufacturing the torque-transmitting shaft 24. The bearing 56 (see FIG. 3), however, is omitted from FIGS. 6A through 6E.

First, two members are prepared, as shown in FIG. 4A: the hollow shaft 61, which has the magnetostrictive films 71, 72 formed on the outer perimeter surface; and the solid shaft 62, which fits into the hollow shaft 61 (preparation step).

Next, the solid shaft 62 is press-fit into the hollow shaft 61 and linked thereto by the pins 67, 67, as shown in FIGS. 4B and 4C (step for linking the shafts). The result is the manufacture of the torque-transmitting shaft 24 shown in FIG. 4D.

Next, a first jig 101 is attached to the jig-mounting part 62*b* on one end of the solid shaft 62 (or to both the jig-mounting part 62*b* and the flange part 62*c*), as shown in FIG. 6A. A second jig 102 is also attached to the jig-mounting part 65 on the other end of the solid shaft 62 (or to both the jig-mounting part 65 and the linking part 63).

Next, a heating apparatus (e.g., an induction hardening apparatus 103) is positioned on the first magnetostrictive film 71, as shown in FIG. 6B. The induction hardening apparatus 103 is composed of: a heating coil 104 that encloses the periphery of the first magnetostrictive film 71; and an power supply unit 105 that supplies high-frequency alternating-current electricity to the heating coil 104.

Next, the second jig 102 is twisted in the clockwise direction R1 of FIG. 6B while the first jig 101 is twisted in the counter-clockwise direction R2 of FIG. 6B (the direction R2 opposite to the direction of the second jig 102). A predetermined torque (referred to as a positive added torque) is thus applied to the solid shaft 62. The magnitude of the positive added torque is preferably approximately 30 to 100 Nm, but a stronger added torque is also acceptable.

The rotation of the hollow shaft 61 is controlled relative to the solid shaft 62, as above, and therefore the predetermined positive added torque is also applied to the hollow shaft 61. As a result, the predetermined positive added torque is also imparted to the first magnetostrictive film 71 (step for imparting external force).

Next, the first magnetostrictive film 71 (particularly the surface and outer layers of the film) is heated by the induction hardening apparatus 103 for a predetermined period of time while the positive added torque is imparted by the first and second jigs 101, 102, as shown in FIG. 6B (heating step). The heating time is preferably approximately three to five seconds but may also be longer. The heating temperature is preferably approximately 400° C.

Next, the first magnetostrictive film 71 is cooled to a temperature lower than the heating temperature, as shown in FIG. 6C (cooling step). The first magnetostrictive film 71 need only be cooled to the temperature of the surrounding air when the heating time for the first magnetostrictive film 71 in the preceding heating step is established as approximately three to five seconds by induction hardening. Since the heating temperature of the first magnetostrictive film 71 is approximately 400° C., the first magnetostrictive film 71 should be cooled to a temperature lower than 400° C.

Next, the twisting of the first and second jigs 101, 102 is ceased, whereby the applied added torque is removed, as shown in FIG. 6C (step for relieving external force).

Next, the induction hardening apparatus 103 is positioned on the second magnetostrictive film 72, as shown in FIG. 6D.

Next, the second jig 102 is twisted in the counter-clockwise direction R2 of FIG. 6B while the first jig 101 is twisted in the clockwise direction R1 of FIG. 6B (the direction R1 opposite to the direction of the second jig 102), opposite to the time before. A predetermined torque (referred to as a negative added torque) is thus applied to the solid shaft 62. The magnitude of the negative added torque is preferably approximately 30 to 100 Nm, but a stronger added torque is also acceptable. The predetermined negative added torque is also applied to the hollow shaft 61, as above. As a result, the predetermined negative added torque is also imparted to the second magnetostrictive film 72 (step for imparting external force).

Next, the second magnetostrictive film 72 (particularly the surface and outer layers of the film) are heated by the induction hardening apparatus 103 for a predetermined period of time while the negative added torque is imparted by the first and second jigs 101, 102, as shown in FIG. 6D (heating step). The heating time is preferably approximately three to five seconds but may also be longer. The heating temperature is preferably approximately 400° C.

Next, the second magnetostrictive film 72 is cooled to a temperature lower than the heating temperature, as shown in FIG. 6E (cooling step). The second magnetostrictive film 72 need only be cooled to the temperature of the surrounding air when the heating time for the second magnetostrictive film 72 in the preceding heating step is established as approximately three to five seconds by induction hardening. Since the heating temperature of the second magnetostrictive film 72 is approximately 400° C., the second magnetostrictive film 72 should be cooled to a temperature lower than 400° C.

Next, the twisting of the first and second jigs 101, 102 is ceased, whereby the applied added torque is removed (step for relieving external force).

Finally, the first and second jigs 101, 102 and the induction hardening apparatus 103 are removed from the torque-transmitting shaft 24, and the operation is complete.

To summarize the first manufacturing method, first the torque-transmitting shaft 24 is manufactured, as shown in FIGS. 4A through 4D. Next, as shown in FIGS. 6A through 6E, a predetermined added torque is applied to at least one of the hollow shaft 61 and the solid shaft 62, whereby the added torque is imparted to the magnetostrictive films 71, 72. The magnetostrictive films 71, 72 are then heated for a predetermined period of time while the added torque is applied. Next, the heated magnetostrictive films 71, 72 are cooled. The applied added torque is then removed.

The torque-transmitting shaft 24 is thus first manufactured in the first manufacturing method by press-fitting the solid shaft 62 into the hollow shaft 61, which has the magnetostrictive films 71, 72 applied to the outer perimeter surface, and interlinking the solid shaft 62 and the hollow shaft 61. Strain is generated on the magnetostrictive films 71, 72 that are subjected to the effects of linkage and press-fitting, and this strain remains in the magnetostrictive films 71, 72.

In the first manufacturing method, the magnetostrictive films 71, 72 are next heated for a predetermined period of time while a predetermined added torque is applied to at least one of the solid shaft 62 and the hollow shaft 61. After the heat treatment is completed, the magnetostrictive films 71, 72 are cooled to a temperature that is lower than the heating temperature, and the added torque that was applied to at least one of the solid shaft 62 and the hollow shaft 61 is removed.

The magnetostrictive films 71, 72 are thus heated for a predetermined period of time while an added torque is applied thereto, whereby creep is generated in the magnetostrictive films 71, 72.

In other words, creep that is generated due to heating the magnetostrictive films 71, 72 is utilized to reduce or remove residual strain in the magnetostrictive films 71, 72. By heating the magnetostrictive films 71, 72 while applying an added torque, the creep can be used to impart a permanent strain anew on the magnetostrictive films 71, 72. The result is that the magnetostrictive direction of the magnetostrictive films 71, 72 can be accurately and easily tilted in the direction in which the added torque is applied. In other words, the first magnetostrictive film 71 and the second magnetostrictive film 72 can be imparted with magnetic anisotropy.

Both the magnetostrictive films 71, 72 and the torque-transmitting part 32 can thus be formed on the torque-transmitting shaft 24 in the first manufacturing method using the optimal methods for each case. Furthermore, the stability of the magnetostrictive properties of the magnetostrictive films 71, 72 can be adequately increased. By increasing the stability of the magnetostrictive properties, the sensor signals of the magnetostrictive torque sensor 41 can be adequately stabilized and the precision of detection can be increased.

Although the torque-transmitting shaft 24 is manufactured by combining two members, the hollow shaft 61 and the solid shaft 62, the following two treatments can be carried out simultaneously.

The first treatment is the treatment for reducing or removing strain produced on the magnetostrictive films 71, 72 by linking and press-fitting the solid shaft 62 to the hollow shaft 61.

The second treatment is the treatment for establishing the magnetostrictive direction of the magnetostrictive films 71, 72, i.e., for establishing magnetic anisotropy.

The torque-transmitting shaft 24, which includes the magnetostrictive films 71, 72 that have adequately stabilized magnetostrictive properties, can therefore be readily manufactured in a small number of steps. As a result, the productivity of the magnetostrictive torque sensor 41 can be increased.

Next, a second method for manufacturing the torque-transmitting shaft 24 will be described. Since the steps for preparing and linking the shafts to manufacture the torque-transmitting shaft 24 as shown in FIGS. 4A through 4D are the same as in the first manufacturing method, a description thereof will be omitted. FIGS. 7A through 7C show the second method for manufacturing the torque-transmitting shaft 24.

After the step for linking the shafts has been completed, the first jig 101 is attached to the jig-mounting part 62*b* of the solid shaft 62, the second jig 102 is attached to the jig-mounting part 65 of the solid shaft 62, and a third jig 106 is attached to the non-magnetostrictive part 79 of the hollow shaft 61, as shown in FIG. 7A. Rotation of the first and second jigs 101, 102 is prevented by attaching fixing members 107, 107. In other words, the rotation of the first and second jigs 101, 102 is controlled. The non-magnetostrictive part 79 acts as a jig-mounting part.

Next, the third jig 106 is twisted in the clockwise direction R1 as shown in FIG. 7B. A predetermined positive torque is thus applied to the hollow shaft 61 and the solid shaft 62. The magnitude of the added torque is preferably approximately 30 to 100 Nm, but a stronger added torque is also acceptable. As a result, the positive added torque is also imparted to the magnetostrictive films 71, 72 (step for imparting external force).

Next, the torque-transmitting shaft 24 is placed in a constant-temperature bath 108 and heated while the added torque is imparted by the third jig 106 as shown in FIG. 7B. Specifically, the magnetostrictive films 71, 72 are heated in the constant-temperature bath 108 for a predetermined period of time (e.g., several hours) (heating step). The heating temperature is preferably approximately 400° C.

Next, the torque-transmitting shaft 24 is removed from the constant-temperature bath 108 and the magnetostrictive films 71, 72 are cooled to a temperature lower than the heating temperature, as shown in FIG. 7C (cooling step). The magnetostrictive films 71, 72 need only be cooled to the temperature of the surrounding air. Since the heating temperature of the magnetostrictive films 71, 72 is approximately 400° C., the magnetostrictive films 71, 72 should be cooled to a temperature lower than 400° C.

Next, the twisting of the third jig 106 is ceased, whereby the applied added torque is removed (step for relieving external force).

Finally, all of the jigs 101, 102, 106 are removed from the torque-transmitting shaft 24, and the operation is complete.

To summarize the second manufacturing method, first the torque-transmitting shaft 24 is manufactured, as shown in FIGS. 4A through 4D. Next, as shown in FIGS. 7A through 7C, a predetermined added torque is applied between the two magnetostrictive films 71, 72 (on the non-magnetostrictive part 79) on the hollow shaft 61 while both ends of the operation shaft 62 are fixed in place, whereby the added torque is imparted to the magnetostrictive films 71, 72. The magnetostrictive films 71, 72 are then heated for a predetermined period of time while the added torque is applied. Next, the heated magnetostrictive films 71, 72 are cooled. The applied added torque is then removed.

The torque-transmitting shaft 24 is thus first manufactured in the second manufacturing method by press-fitting the solid shaft 62 into the hollow shaft 61, which has the magnetostrictive films 71, 72 applied to the outer perimeter surface, and interlinking the solid shaft 62 and the hollow shaft 61. Strain is generated on the magnetostrictive films 71, 72 that are subjected to the effects of linkage and press-fitting, and this strain remains in the magnetostrictive films 71, 72.

In the second manufacturing method, the magnetostrictive films 71, 72 are next heated for a predetermined period of time while the previously established added torque is applied between the magnetostrictive films 71, 72 on the hollow shaft 61 while both ends of the operation shaft 62 are fixed in place.

After the heat treatment is completed, the magnetostrictive films 71, 72 are cooled to a temperature that is lower than the heating temperature, and the torque that was applied to the magnetostrictive films 71, 72 is removed.

The magnetostrictive films 71, 72 are thus heated for a predetermined period of time while a torque is applied thereto, whereby creep is generated in the magnetostrictive films 71, 72.

In other words, creep that is generated due to heating the magnetostrictive films 71, 72 is utilized to reduce or remove residual strain in the magnetostrictive films 71, 72. By heating the magnetostrictive films 71, 72 while applying an added torque, the creep can be used to impart a permanent strain anew on the magnetostrictive films 71, 72. The result is that the magnetostrictive direction of the magnetostrictive films 71, 72 can be accurately and easily tilted in the direction in which the added torque is applied. In other words, the first magnetostrictive film 71 and the second magnetostrictive film 72 can be imparted with magnetic anisotropy.

Both the magnetostrictive films 71, 72 and the torque-transmitting part 32 can thus be formed on the torque-transmitting shaft 24 in the second manufacturing method using the optimal methods for each case. Furthermore, the stability of the magnetostrictive properties of the magnetostrictive films 71, 72 can be adequately increased. By increasing the stability of the magnetostrictive properties, the sensor signals of the magnetostrictive torque sensor 41 can be adequately stabilized and the precision of detection can be increased.

Although the torque-transmitting shaft 24 is manufactured by combining two members, the hollow shaft 61 and the solid shaft 62, the following two treatments can be carried out simultaneously.

The first treatment is the treatment for reducing or removing strain produced on the magnetostrictive films 71, 72 by linking and press-fitting the solid shaft 62 to the hollow shaft 61.

The second treatment is the treatment for establishing the magnetostrictive direction of the magnetostrictive films 71, 72, i.e., the step for establishing magnetic anisotropy.

The torque-transmitting shaft 24, which includes the magnetostrictive films 71, 72 that have adequately stabilized magnetostrictive properties, can therefore be readily manufactured in a small number of steps. As a result, the productivity of the magnetostrictive torque sensor 41 can be increased.

Next, a manufacturing method wherein the magnetostrictive torque sensor 41 is applied to a "magnetostrictive axial-force sensor," and, in particular, a method for manufacturing the shaft 24 for transmitting axial force are described. The configuration of the magnetostrictive torque sensor 41 as applied to a magnetostrictive axial-force sensor was described above.

Hereinafter, the magnetostrictive torque sensor 41 will be referred to as the "magnetostrictive axial-force sensor 41," the torque-transmitting shaft 24 will be referred to as the "the shaft 24 for transmitting axial force," the torque shaft 61 will be referred to as "the axial-force shaft 61," and the pinion shaft 62 will be referred to as "the transmission shaft 62." The axial-force shaft 61 may also be referred to as "the hollow shaft 61," and the transmission shaft 62 may also be referred to as "the solid shaft 62."

Since the steps for preparing and linking the shafts to manufacture the shaft 24 for transmitting axial force as shown in FIGS. 4A through 4D are the same as in the first manufacturing method, a description thereof will be omitted. FIGS. 8A through 8E show the method for manufacturing the shaft 24 for transmitting axial force.

Once the step for linking the shafts is completed, a first compression jig 111 is attached to the supported part 62a on one end of the solid shaft 62, and a second compression jig 112 is attached to the linking part 63 on the other end of the solid shaft 62, as shown in FIG. 8A. The supported part 62a and the linking part 63 act as jig-mounting parts.

Next, a heating apparatus (e.g., the induction hardening apparatus 103) is positioned on the first magnetostrictive film 71, as shown in FIG. 8B.

Next, the first and second compression jigs 111, 112 are made to press onto both ends of the solid shaft 62. A predetermined compressive force is thus applied to the solid shaft 62. The magnitude of the compressive force is preferably approximately 100 kgf, but a stronger compressive force is also acceptable. The axial displacement of the hollow shaft 61 is configured to be controlled relative to the solid shaft 62, as above, and therefore the predetermined compressive force is also applied to the hollow shaft 61. As a result, the predetermined compressive force is also imparted to the first magnetostrictive film 71 (step for imparting external force).

Next, the first magnetostrictive film 71 (particularly the surface and outer layers of the film) are heated by the induction hardening apparatus 103 for a predetermined period of time while the compressive force is imparted by the first and second compression jigs 111, 112, as shown in FIG. 8B (heating step). The heating time is preferably several seconds but may also be longer. The heating temperature is preferably approximately 400° C.

Next, the first magnetostrictive film 71 is cooled to a temperature lower than the heating temperature, as shown in FIG. 8C (cooling step). The first magnetostrictive film 71 need only be cooled to the temperature of the surrounding air when the heating time for the first magnetostrictive film 71 in the preceding heating step is established as several seconds by induction hardening. Since the heating temperature of the first magnetostrictive film 71 is approximately 400° C., the first magnetostrictive film 71 should be cooled to a temperature lower than 400° C.

Next, the compression of the first and second compression jigs 111, 112 is ceased, whereby the applied compressive force is removed (step for relieving external force).

Next, the first and second compression jigs 111, 112 are removed, and instead a first tension jig 113 is attached to the jig-mounting part 62b on one end of the solid shaft 62, and a second tension jig 114 is attached to the jig-mounting part 65 on the other end of the solid shaft 62, as shown in FIG. 8C.

Next, the induction hardening apparatus 103 is positioned on the second magnetostrictive film 72, as shown in FIG. 8D.

Next, the first and second tension jigs 113, 114 are made to pull on both ends of the solid shaft 62. A predetermined tensile force is thereby applied to the solid shaft 62. The magnitude of the tensile force is preferably approximately 100 kgf, but a stronger tensile force is also acceptable. The predetermined tensile force is also applied to the hollow shaft 61, as above. As a result, the predetermined tensile force is also imparted to the second magnetostrictive film 72 (step for imparting external force).

Next, the second magnetostrictive film 72 (particularly the surface and outer layers of the film) is heated by the induction hardening apparatus 103 for a predetermined period of time while the tensile force is imparted by the first and second tension jigs 113, 114, as shown in FIG. 8D (heating step). The heating time is preferably several seconds but may also be longer. The heating temperature is preferably approximately 400° C.

Next, the second magnetostrictive film 72 is cooled to a temperature lower than the heating temperature, as shown in FIG. 8E (cooling step). The second magnetostrictive film 72 need only be cooled to the temperature of the surrounding air when the heating time for the second magnetostrictive film 72 in the preceding heating step is established as several seconds by induction hardening. Since the heating temperature of the second magnetostrictive film 72 is approximately 400° C., the second magnetostrictive film 72 should be cooled to a temperature lower than 400° C.

Next, the tension of the first and second tension jigs 113, 114 is ceased, whereby the applied tensile force is removed (step for relieving external force).

Finally, the first and second tension jigs 113, 114 and the induction hardening apparatus 103 are removed from the shaft 24 for transmitting axial force, and the operation is complete.

To summarize the method for manufacturing the shaft 24 for transmitting axial force, first the shaft 24 for transmitting axial force is manufactured, as shown in FIGS. 4A through 4D. Next, as shown in FIGS. 8A through 8E, a predetermined compressive force or tensile force is applied to at least one of the hollow shaft 61 and the solid shaft 62, whereby the compressive force or tensile force is imparted to the magnetostrictive films 71, 72. The magnetostrictive films 71, 72 are then heated for a predetermined period of time while the compressive force or tensile force is applied. Next, the heated magnetostrictive films 71, 72 are cooled. The applied compressive force or tensile force is then removed.

The shaft 24 for transmitting axial force is thus first manufactured in the method for manufacturing the shaft 24 for transmitting axial force by press-fitting the solid shaft 62 into the hollow shaft 61, which has the magnetostrictive films 71, 72 applied to the outer perimeter surface, and interlinking the solid shaft 62 and the hollow shaft 61. Strain is generated on the magnetostrictive films 71, 72 that are subjected to the effects of linkage and press-fitting, and this strain remains in the magnetostrictive films 71, 72.

In the method for manufacturing the shaft 24 for transmitting axial force, the magnetostrictive films 71, 72 are next heated for a predetermined period of time while a predetermined compressive force or tensile force is applied to at least one of the solid shaft 62 and the hollow shaft 61. After the heat treatment is completed, the magnetostrictive films 71, 72 are cooled to a temperature that is lower than the heating temperature, and the compressive force or tensile force that was applied to at least one of the solid shaft 62 and the hollow shaft 61 is removed.

The magnetostrictive films 71, 72 are thus heated for a predetermined period of time while a compressive force or tensile force is applied thereto, whereby creep is generated in the magnetostrictive films 71, 72.

In other words, creep that is generated due to heating the magnetostrictive films 71, 72 is utilized to reduce or remove residual strain in the magnetostrictive films 71, 72. By heating the magnetostrictive films 71, 72 while applying a compressive force or tensile force, the creep can be used to impart a permanent strain anew on the magnetostrictive films 71, 72. The result is that the magnetostrictive direction of the magnetostrictive films 71, 72 can be accurately and easily tilted in the direction in which the compressive force or tensile force is applied. In other words, the first magnetostrictive film 71 and the second magnetostrictive film 72 can be imparted with magnetic anisotropy.

Both the magnetostrictive films 71, 72 and the part 32 for transmitting axial force can thus be formed on the shaft 24 for transmitting axial force in the method for manufacturing the shaft 24 for transmitting axial force using the optimal methods for each case. Furthermore, the stability of the magnetostrictive properties of the magnetostrictive films 71, 72 can be adequately increased. By increasing the stability of the magnetostrictive properties, the sensor signals of the magnetostrictive axial force sensor 41 can be adequately stabilized and the precision of detection can be increased.

Although the shaft 24 for transmitting axial force is manufactured by combining two members, the hollow shaft 61 and the solid shaft 62, the following two treatments can be carried out simultaneously.

The first treatment is the treatment for reducing or removing strain produced on the magnetostrictive films 71, 72 by linking and press-fitting the solid shaft 62 to the hollow shaft 61.

The second treatment is the treatment for establishing the magnetostrictive direction of the magnetostrictive films 71, 72, i.e., the step for establishing magnetic anisotropy.

The shaft 24 for transmitting axial force, which includes the magnetostrictive films 71, 72 that have adequately stabilized magnetostrictive properties, can therefore be readily manufactured in a small number of steps. As a result, the productivity of the magnetostrictive axial-force sensor 41 can be increased.

The linking structure of the hollow shaft 61 and the solid shaft 62 in the present invention is not limited to linking by the pins 67 but may also involve, e.g., linking by press-fitting alone or by screws.

The magnetostrictive mechanical quantity sensor 41 of the present invention is suitable for use as a torque sensor provided to an electric power steering apparatus for use in a vehicle, an axial-force sensor provided to an electric brake system for use in a vehicle, and the like.

Obviously, various minor changes and modifications of the present invention are possible in light of the above teaching. It is therefore to be understood that within the scope of the appended claims the invention may be practiced otherwise than as specifically described.

What is claimed is:

1. A magnetostrictive mechanical quantity sensor for detecting a torque or an axial force, comprising:
    an operating shaft upon which the torque or the axial force acts from an external origin;
    a hollow shaft having a first magnetostrictive film formed on an outer perimeter surface, the hollow shaft including at least one pin hole defined therethrough; and
    at least one fitting-flange part encircling the operating shaft, the at least one fitting-flange part having a pair of pin holes passing therethrough in a direction orthogonal relative to a longitudinal axis of the operating shaft at a location corresponding to the at least one pin hole defined in the hole shaft,
    wherein the at least one fitting-flange part is disposed directly between the hollow shaft and the operating shaft, and wherein pins are provided in the pair of pin holes of the at least one fitting-flange part and the at least one pin hole defined through the hollow shaft linking the operating shaft to the hollow shaft.

2. The sensor of claim 1, wherein at least one of the operating shaft and the hollow shaft comprises a jig-mounting part for allowing attachment of a jig that applies a predetermined added torque or added axial force when establishing a magnetostrictive direction of the first magnetostrictive film.

3. The sensor of claim 1, wherein the hollow shaft further comprises a second magnetostrictive film formed on the outer perimeter surface thereof, the first magnetostrictive film and the second magnetostrictive film being spaced from each other by a predetermined distance in a longitudinal direction of the hollow shaft.

* * * * *